(12) United States Patent
Gernhardt et al.

(10) Patent No.: US 11,748,374 B2
(45) Date of Patent: *Sep. 5, 2023

(54) REPLICATION GROUP OBJECTS CONFIGURATION IN A NETWORK-BASED DATABASE SYSTEM

(71) Applicant: Snowflake Inc., Bozeman, MT (US)

(72) Inventors: Robert Bengt Benedikt Gernhardt, Seattle, WA (US); Mikhail Kazhamiaka, Bellevue, WA (US); Nithin Mahesh, Redmond, WA (US); Laxman Mamidi, Redwood City, CA (US); Subramanian Muralidhar, Mercer Island, WA (US); Vishnu Dutt Paladugu, Seattle, WA (US); Sahaj Saini, Seattle, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/457,751

(22) Filed: Dec. 6, 2021

(65) Prior Publication Data

US 2023/0169090 A1 Jun. 1, 2023

Related U.S. Application Data

(60) Provisional application No. 63/264,699, filed on Nov. 30, 2021.

(51) Int. Cl.
*G06F 16/00* (2019.01)
*G06F 16/27* (2019.01)
(Continued)

(52) U.S. Cl.
CPC ......... *G06F 16/27* (2019.01); *G06F 11/1461* (2013.01); *G06F 11/1464* (2013.01);
(Continued)

(58) Field of Classification Search
CPC ...... G06F 16/27; G06F 16/256; G06F 16/184; G06F 16/1787; G06F 16/137;
(Continued)

(56) References Cited

U.S. PATENT DOCUMENTS

| 6,792,540 B1* | 9/2004 | Smith | G06F 21/6227 |
| | | | 707/999.009 |
| 8,886,796 B2* | 11/2014 | Calder | H04L 67/1002 |
| | | | 709/224 |

(Continued)

FOREIGN PATENT DOCUMENTS

| EP | 1770944 A1 * | 4/2007 |
| WO | WO2006039020 A1 * | 4/2006 |

(Continued)

OTHER PUBLICATIONS

Felipe Castro-Medina et al., "Design of a Horizontal Data Fragmentation, Allocation and Replication Method in the Cloud", IEEE 15th International Conference on Automation Science and Engineering (CASE), Aug. 2019, pp. 614-621.*

(Continued)

*Primary Examiner* — Srirama Channavajjala
(74) *Attorney, Agent, or Firm* — Schwegman Lundberg & Woessner, P.A.

(57) ABSTRACT

Provided herein are systems and methods for configuring replication group objects. A system includes at least one hardware processor coupled to memory and configured to decode a replication request received from a client device of a data provider. The replication request indicates a plurality of account objects for replication. The plurality of account objects associated with a corresponding plurality of account object types. A replication group object is generated based on the replication request. The replication group object includes a manifest. The manifest lists the plurality of account objects. The replication of the plurality of account (Continued)

objects is performed from a source account of the data provider into at least one target account. The replication is based on the manifest of the replication group object.

30 Claims, 19 Drawing Sheets

(51) Int. Cl.

| | | |
|---|---|---|
| *G06F 11/14* | (2006.01) | |
| *G06F 16/25* | (2019.01) | |
| *G06F 11/20* | (2006.01) | |
| *G06F 16/182* | (2019.01) | |
| *G06F 16/13* | (2019.01) | |
| *G06F 16/178* | (2019.01) | |
| *G06F 16/11* | (2019.01) | |

(52) U.S. Cl.
CPC ...... *G06F 11/2023* (2013.01); *G06F 11/2097* (2013.01); *G06F 16/128* (2019.01); *G06F 16/137* (2019.01); *G06F 16/1787* (2019.01); *G06F 16/184* (2019.01); *G06F 16/1827* (2019.01); *G06F 16/1844* (2019.01); *G06F 16/256* (2019.01)

(58) Field of Classification Search
CPC ............... G06F 16/128; G06F 16/1844; G06F 16/1827; G06F 11/1461; G06F 11/1464; G06F 11/2023; G06F 11/2097; G06F 11/2064; G06F 21/604; G06F 21/6218
See application file for complete search history.

(56) References Cited

U.S. PATENT DOCUMENTS

| | | | | |
|---|---|---|---|---|
| 8,935,418 B2* | 1/2015 | Knouse | ............... | H04L 63/0815 |
| | | | | 709/225 |
| 9,256,722 B2* | 2/2016 | Saxman | ............... | H04L 63/083 |
| 10,949,402 B1* | 3/2021 | Chu | ............... | G06F 16/1827 |
| 11,144,511 B1* | 10/2021 | Chu | ............... | G06F 16/128 |
| 11,399,029 B2* | 7/2022 | Manna | ............... | G06F 16/13 |
| 2008/0256606 A1* | 10/2008 | Koikara | ............... | G06F 21/604 |
| | | | | 726/4 |
| 2011/0040792 A1* | 2/2011 | Perry | ............... | G06F 16/1844 |
| | | | | 707/783 |
| 2013/0054524 A1* | 2/2013 | Anglin | ............... | G06F 16/27 |
| | | | | 707/624 |
| 2014/0207667 A1* | 7/2014 | Korosec | ............... | G06Q 20/22 |
| | | | | 705/39 |
| 2014/0279526 A1* | 9/2014 | Jackson | ............... | G06Q 20/405 |
| | | | | 705/44 |
| 2015/0180894 A1* | 6/2015 | Sadovs | ............... | H04W 12/12 |
| | | | | 726/22 |
| 2016/0259533 A1* | 9/2016 | Sudabattula | ........ | G06F 3/04842 |
| 2017/0163650 A1* | 6/2017 | Seigel | ............... | H04L 63/102 |
| 2017/0329834 A1* | 11/2017 | O'Neill | ............... | G06F 16/27 |
| 2017/0371567 A1* | 12/2017 | Piduri | ............... | G06F 3/065 |
| 2018/0004761 A1* | 1/2018 | Doherty | ............... | G06F 11/2064 |
| 2019/0190957 A1* | 6/2019 | Barboi | ............... | H04L 63/20 |
| 2019/0306237 A1* | 10/2019 | Srinivasan | ............ | H04W 12/10 |
| 2019/0317869 A1* | 10/2019 | Selvaraj | ............... | G06F 11/203 |
| 2019/0391917 A1* | 12/2019 | Barker | ............... | G06F 16/137 |
| 2020/0081901 A1* | 3/2020 | Arnold | ............... | H04L 67/1095 |
| 2020/0195651 A1* | 6/2020 | Festa | ............... | G06F 21/604 |
| 2021/0136083 A1* | 5/2021 | Gordon | ............... | H04L 63/10 |
| 2021/0165573 A1* | 6/2021 | Demoor | ............... | G06F 11/1415 |
| 2021/0224409 A1* | 7/2021 | Avanes | ............... | G06F 21/6218 |
| 2021/0357294 A1* | 11/2021 | Balcha | ............... | G06F 3/067 |
| 2021/0390083 A1* | 12/2021 | Chu | ............... | G06F 16/1844 |

FOREIGN PATENT DOCUMENTS

| | | | |
|---|---|---|---|
| WO | WO2009131798 A1 * | 10/2009 | |
| WO | WO2012162176 A2 * | 11/2012 | |
| WO | WO2016003840 A1 * | 1/2016 | |
| WO | WO2016065080 A1 * | 4/2016 | |
| WO | WO2018125989 A2 * | 7/2018 | |
| WO | WO 2022026973 A1 * | 2/2022 | |

OTHER PUBLICATIONS

Jinwei Liu et al., "A Low-Cost Multi-Failure Resilient Replication Scheme for High-Data Availability inCloud Storage", IEEE/ACM Transactions on Networking (vol. 29, Issue: 4, Aug. 2021), pp. 1436-1451.*
"International Application Serial No. PCT/US2022/080591, International Search Report dated Jan. 3, 2023", 2 pgs.
"International Application Serial No. PCT/US2022/080591, Written Opinion dated Jan. 3, 2023", 6 pgs.

* cited by examiner

REPLICATION GROUP OBJECTS CONFIGURATION IN A NETWORK-BASED DATABASE SYSTEM

CROSS-REFERENCE TO RELATED APPLICATION

This application claims the benefit of priority to U.S. Provisional Patent Application Ser. No. 63/264,699 filed Nov. 30, 2021, the contents of which are incorporated herein by reference in their entirety.

TECHNICAL FIELD

Embodiments of the disclosure relate generally to databases and, more specifically, to replication group object configuration and use in connection with replication functionalities performed in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
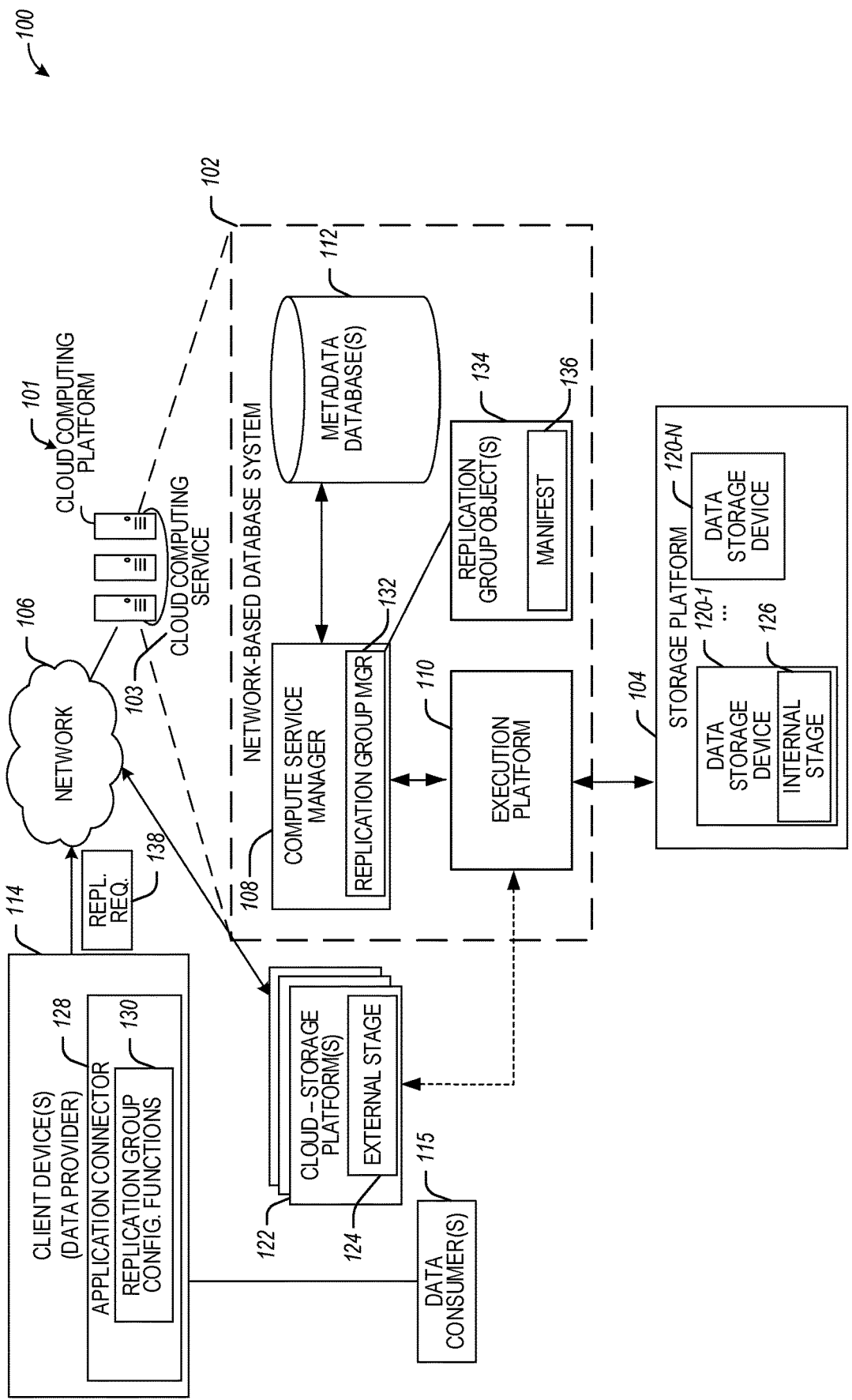
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a customer account) may reside as an object within, e.g., a customer account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

Existing database replication techniques are based on replicating only a single database object (e.g., schemas, tables, columns, sequences, and functions underneath a database object). However, if an object in a first database that is being replicated refers to an object in a second database, then a refresh of the first database would fail. If databases are replicated separately, such databases may not be transactionally consistent with each other as each database will be replicated in a certain time difference between databases.

Aspects of the present disclosure provide techniques for configuration and use of a replication group object (also referred to as a "replication group") in connection with data replication in a database system. The replication group object can be configured as an object storing a manifest of which objects to replicate from a source account (e.g., an account of a data provider), which target accounts (e.g., accounts of the data provider or a customer of the data provider such as a data consumer) to replicate these objects to, and at what schedule such replication can be performed. In this regard, using a replication group object in connection with data replication allows for the ability to replicate multiple databases with point-in-time consistency transactionally, the ability to replicate more than database objects transactionally including multiple account objects, and the ability to replicate automatically on a schedule. Additional benefits of using a replication group object include simplicity in data management, ability to have related objects across different databases (e.g., across different remote deployment accounts of a data provider), ability to replicate account metadata along with data, transactional consistency during replication across multiple databases, and simplified management of replication refreshes.

The various embodiments that are described herein are described with reference where appropriate to one or more of the various figures. An example computing environment with an application connector (e.g., as installed at a client device) configured to perform replication group configuration functions, as well as a compute service manager with a replication group manager (e.g., configured to generate a replication group object and perform disclosed functionalities associated with such object) are discussed in connection with FIGS. 1-3. Example multi-deployment arrangements using replication groups are discussed in connection with FIG. 4 and FIG. 5. Additional database system arrangements using replication groups for failover and sharing are discussed in connection with FIG. 6-FIG. 9. Example replication group configurations and usages are discussed in connection with FIG. 10-FIG. 18. A more detailed discussion of example computing devices that may be used with the disclosed techniques is provided in connection with FIG. 19.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform replication group configuration functions 130. For example, client device 114 can be associated with a data provider using the cloud computing service 103 of the network-based database system 102. In some embodiments, replication group configuration functions 130 include generating a replication request 138 for communication to the network-based database system 102 via the network 106. For example, replication request 138 can be communicated to the replication group manager 132 of the compute service manager 108. The replication group manager 132 is configured to generate a replication group object 134 with a manifest 136 using the replication request 138.

In some embodiments, manifest 136 of the replication group object 134 indicates a plurality of account objects for replication. In some aspects, the plurality of account objects can be associated with a corresponding plurality of account object types. In some aspects, the plurality of account object types comprises at least one of the following: a users account object type, a roles account object type, a warehouse object type, a resource monitor object type, a database account object type, a share account object type, an integration account object type, and network policies account object type.

In some embodiments, a users account object of the users account object type lists users authorized to access at least one target account (e.g., an account of a data provider or data consumer 115). In some embodiments, a roles account object of the roles account object type configures privileges for the users to access the at least one target account. In some aspects, a warehouse object of the warehouse object type indicates compute resources (e.g., at least one virtual warehouse of the execution platform 110) for executing a workload associated with one or more databases of the data provider. In some embodiments, a resource monitor object of the resource monitor object type configures monitoring usage of the compute resources.

In some aspects, a database account object of the database account object type indicates one or more databases of the data provider. In some embodiments, the replication group configuration functions 130 also includes generating the replication request to further include the database account object and a list of at least one allowed database. The at least one allowed database can be a subset of the one or more databases of the data provider.

In some embodiments, a share account object of the share account object type is an object that encapsulates information used for sharing a database. A share may include: (a) privileges that grant access to the database and the schema containing the objects to share; (b) the privileges that grant access to the specific objects in the database; and (c) the consumer accounts with which the database and its objects are shared. Once a database is created (e.g., in a consumer account) from a share, all the shared objects are accessible to users in the consumer account.

In some embodiments, an integration account object (also referred to as an application programming interface (API) integration) of the integration account object type is used to store information about a proxy service (e.g., Hypertext Transfer Protocol Secure, or HTTPS, proxy service), including the following information: (a) the cloud platform provider (e.g., Amazon AWS); (b) the type of proxy service (in case the cloud platform provider offers more than one type of proxy service); (c) the identifier and access credentials for a cloud platform role that has sufficient privileges to use the proxy service (for example, on AWS, the role's ARN (Amazon resource name) serves as the identifier and access credentials; when this cloud user is granted appropriate privileges, this user can be to access resources on the proxy service (an instance of the cloud platform's native HTTPS proxy service, for example, an instance of an Amazon API Gateway)); (d) an API integration object also specifies allowed (and optionally blocked) endpoints and resources on those proxy services.

In some embodiments, a network policy object of the network policies account object type provides options for managing network configurations in a network-based database system. A network policy object can be used to restrict access to an account based on the user IP address. Effectively, a network policy enables creating an IP allowed list, as well as an IP blocked list, if desired. In this regard, account-level network policy management can be performed through a web interface or SQL.

In some embodiments, the replication group configuration functions 130 also includes generating the replication request to further include scheduling information. The replication group manager 132 can use the scheduling information to configure a replication schedule, and perform replication of the account objects specified by manifest 136 based on the replication schedule.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object).

Figure 3:
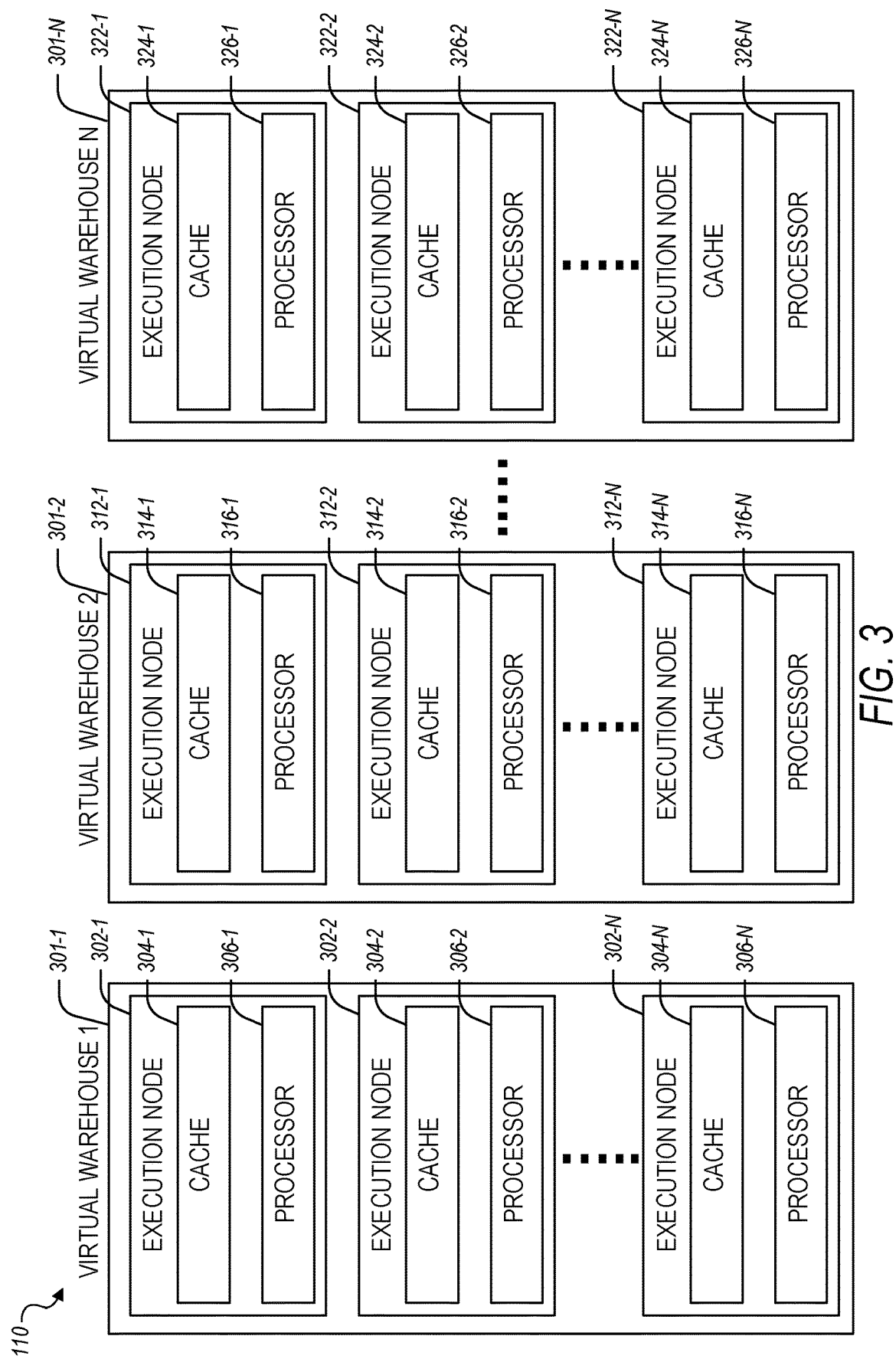
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a replication group manager 132. The replication group manager 132 comprises suitable circuitry, interfaces, logic, and/or code and is configured to perform the disclosed functionalities associated with configuration and use of replication group objects. For example, the replication group manager 132 generates a replication group object 134 based on the replication request 138. The replication group object 134 includes a manifest 136, which lists a plurality of account objects for replication. The replication group manager 132 is also configured to perform a replication of the plurality of account objects from a source account of the data provider into at least one target account based on the manifest of the replication group object. For example, the replication group manager 132 replicates different account objects (which can include a database account object or other types of account objects) to one or more designated target accounts at a predefined schedule, based on the contents of the manifest of the replication group object 134. In this regard, the replication group object 134 can be used for grouping databases and account objects that can be replicated as a single unit. Such replication reduces the complexity in managing DR scenarios and facilitates automated scheduled refreshes. Additionally, the replication group object 134 allows for replication of multiple databases together, in a transactionally consistent manner, with dependent objects between databases. Additional functionalities associated with the configuration of replication group objects are discussed in connection with FIG. 4-FIG. 19.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
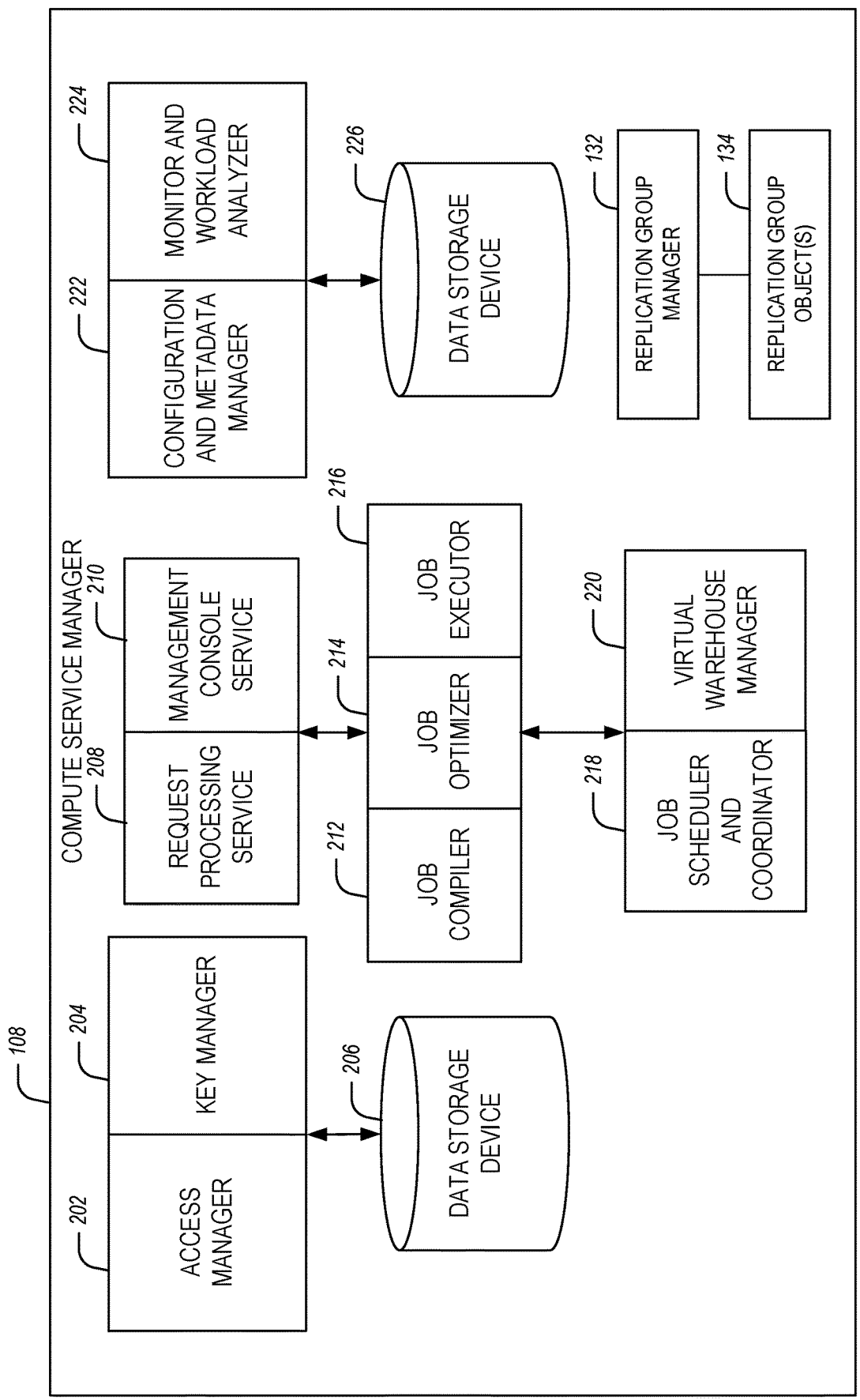
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the replication group manager 132 configured to perform the disclosed functionalities associated with configuration and use of replication group objects. For example, the replication group manager 132 generates a replication group object 134 based on the replication request 138.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 (e.g., execution node 302-1) can be configured with the replication group manager 132.

Some example embodiments involve provisioning a remote account of a data provider—a type of account that is referred to herein at times as a "remote-deployment account," a "remote-deployment account of a data provider," a "data-provider remote account," and the like—with one or more replication group objects for purposes of performing replication from a source account into a target account.

It is also noted here that the terms "replication" and "refresh" (and similar forms such as "replicating," "refreshing," etc.) are used throughout the present disclosure. Generally speaking, "refresh" and its various forms are used to refer to a command or instruction that causes a database to start receiving one-way syncing (e.g., "pushed" updates). The term "replicate" and its various forms are used in a few different ways. In some cases, the "replicate" terms are used as a precursor to the "refresh" terms, where the "replicate" terms refer to the preparatory provisioning (populating, storing, etc.) of account objects, in some cases along with one or task objects as described herein. When used in that manner, the "replicate" terms can be analogized to putting up scaffolding for a building, and the "refresh" terms can be analogized to putting up the building.

The "replicate" terms are also used in another way herein—in those cases, the terms are used as a general label for what a data consumer may request (e.g., via their data provider) when the data consumer wishes to have made available to them a local instance of a given database at a given remote-deployment account of their data provider. That is, the data consumer may request "replication" of a given database to a given remote deployment, and a data platform may responsively perform operations such as the more technical "replicate" operations (putting up the scaffolding) using one or more replication group objects and "refresh" operations (building, populating, filling in, etc.) that are also described herein.

Figure 4:
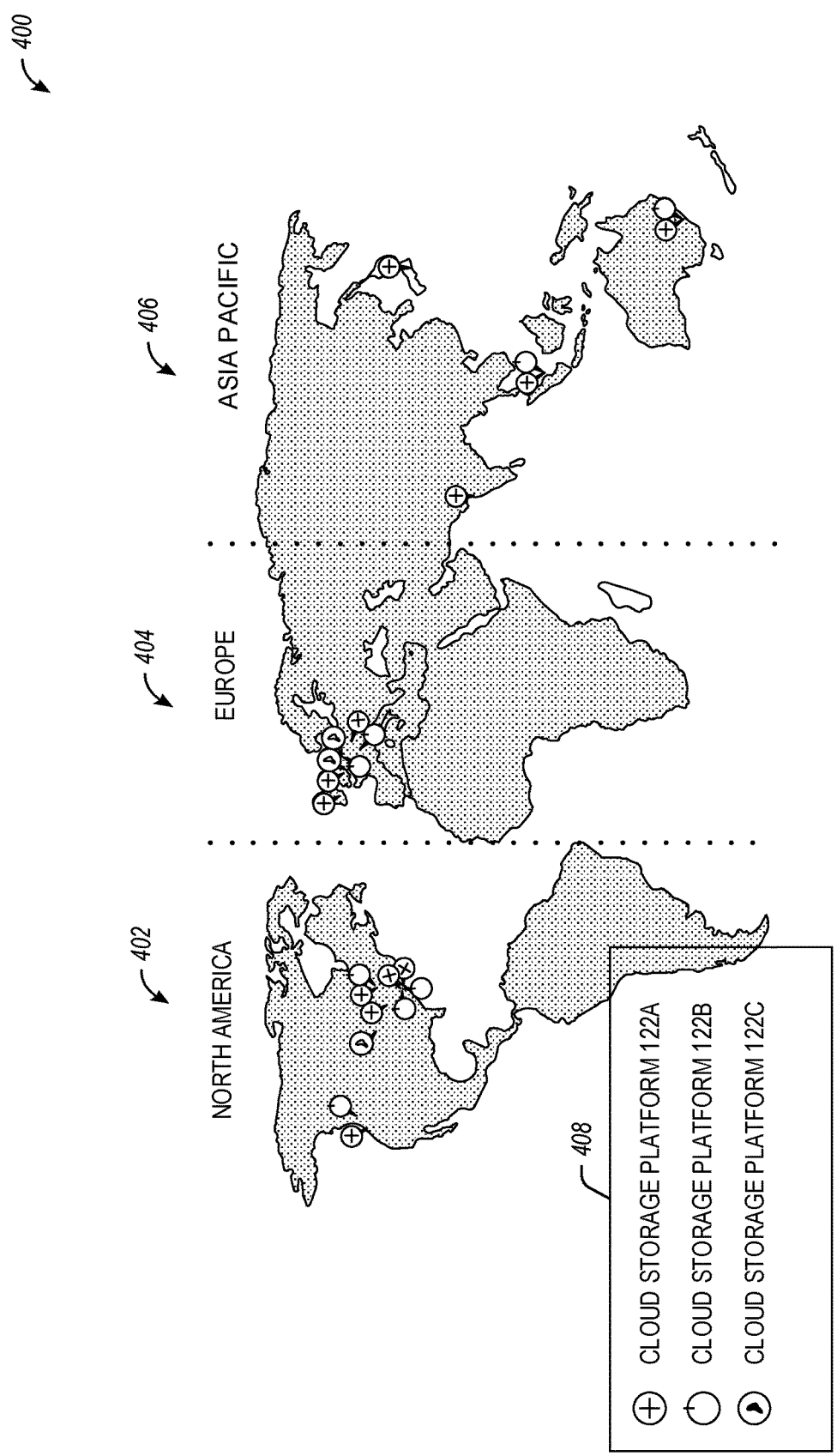
FIG. 4 illustrates an example regional-deployment map for the example database system of FIG. 1, in accordance with some embodiments of the present disclosure.

FIG. 4 illustrates an example regional-deployment map 400 for the example database system of FIG. 1, in accordance with some embodiments of the present disclosure. The regional-deployment map 400 is presented purely by way of example and not limitation, as different numbers and/or boundaries of regions could be demarcated in different implementations. As can be seen in FIG. 4, the regional-deployment map 400 includes three example geographic regions: North American region 402, European region 404, and Asia Pacific region 406. Moreover, various instances of deployments of the network-based database system 102 are depicted on the regional-deployment map 400. A legend 408 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as cloud-storage platforms 122, which are also illustrated in FIG. 1.

In some embodiments, replication group projects configured based on the disclosed techniques can be used in disaster recovery (DR) and global data sharing use cases associated with source accounts (e.g., accounts of a data provider) and target accounts (e.g., accounts of a data provider or a dealer consumer) located in different deployments.

Figure 5:
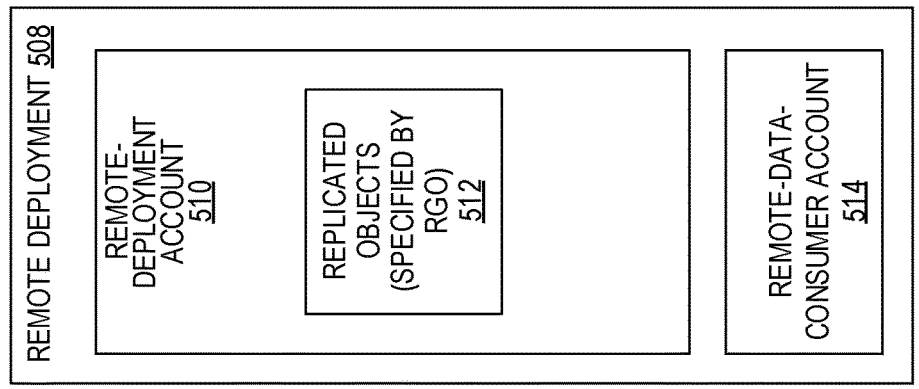
FIG. 5 illustrates an example multi-deployment arrangement using a replication group object for object replication, in accordance with some embodiments of the present disclosure.
Figure 5:
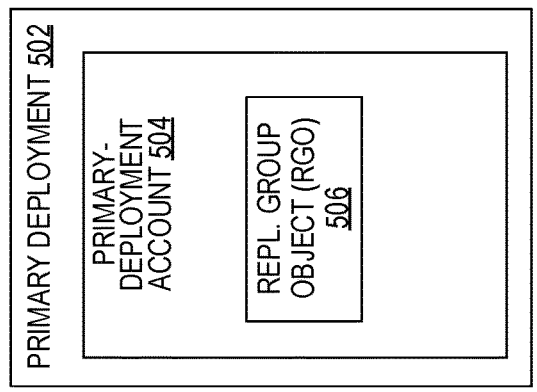

FIG. 5 illustrates an example multi-deployment arrangement 500 using a replication group object for object replication, in accordance with some embodiments of the present disclosure. The example multi-deployment arrangement 500 includes a primary deployment 502 of the network-based database system 102 and a remote deployment 508 of the network-based database system 102. In an example scenario, a data provider (e.g., the data provider associated with client device 114) has a primary-deployment account 504 at the primary deployment 502, and a remote-deployment account 510 at the remote deployment 508. The remote deployment 508 also includes a remote-data-consumer account 514 that is associated with the data consumer 115. In some embodiments, the primary deployment 502 and the remote deployment 508 may be located in the same or different geographic regions.

In some embodiments, the primary deployment account 504 of the primary deployment 502 can include a replication group object (RGO) 506. The RGO 506 can include a manifest listing multiple account objects (including one or more databases), which can be replicated together into the remote deployment account 510, generating replicated objects 512. Even though FIG. 5 illustrates object replication using the RGO 506 from a source accounts (e.g., primary deployment account 504) of a data provider into a remote deployment account 510 of the data provider, the disclosure is not limited in this regard, and replication of the data objects listed in the manifest of RGO 506 can be performed into the remote data consumer account 514 associated with a data consumer (e.g., a customer of the data provider).

Figure 6:
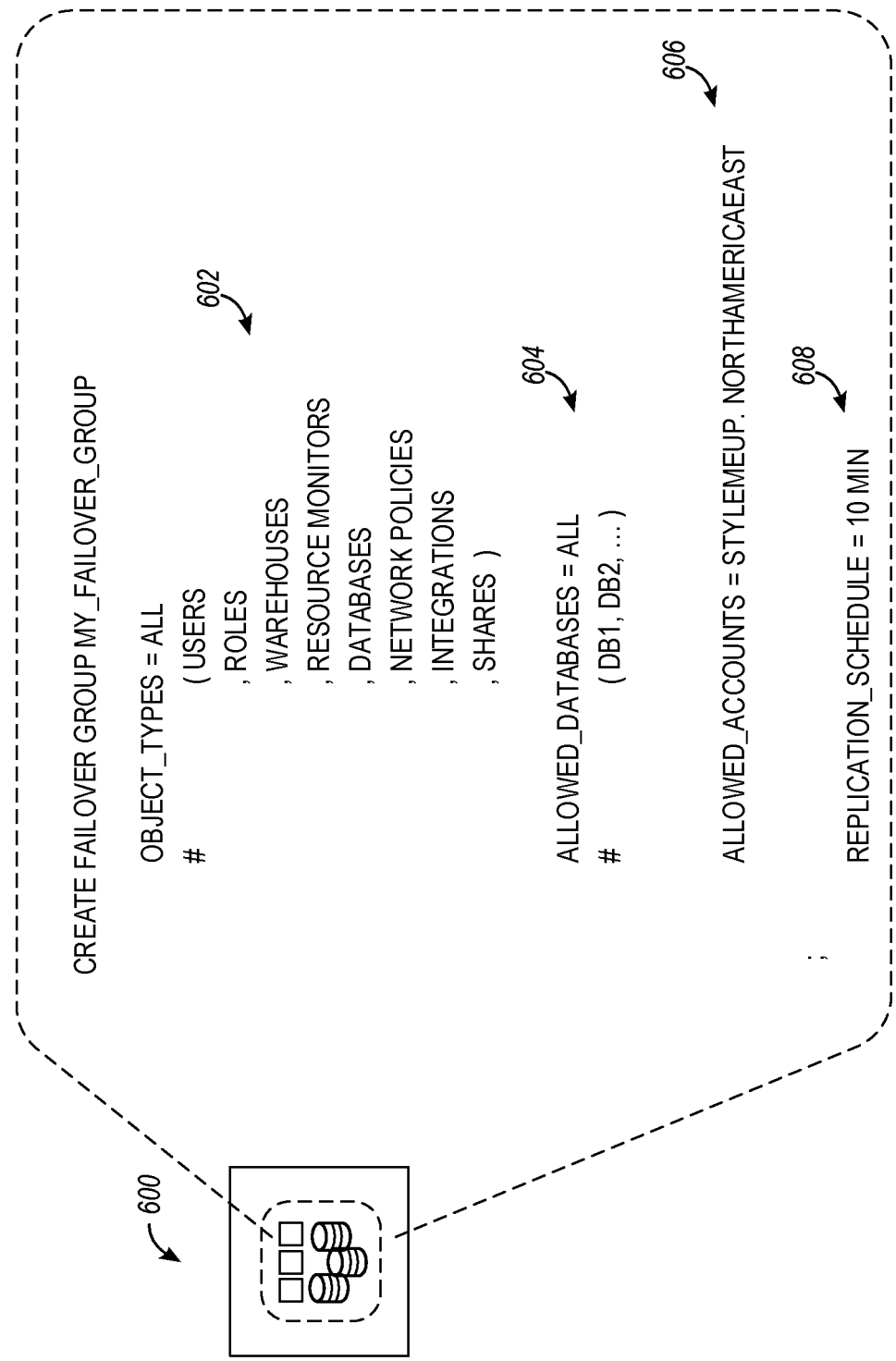
FIG. 6 illustrates an example replication group object, in accordance with some embodiments of the present disclosure.

FIG. 6 illustrates an example RGO 600, in accordance with some embodiments of the present disclosure. The RGO 600 includes a manifest with a customer-defined collection of account objects 602 which can be replicated and failed over as a unit. Account objects 602 can include account objects of different account object types, such as users account objects, roles account objects, warehouse objects, resource monitor objects, and database objects. A users account object lists users authorized to access the at least one target account into which replication is performed. In this regard, a users account object is an object that is backing an identity.

A roles account object configures privileges for the users to access the at least one target account. For example, a certain role is given access to a certain number of objects or operations (e.g., a role has a certain number of privileges), and a user can be assigned a role.

A warehouse object indicates compute resources for executing the workload associated with one or more databases of a data provider. The warehouse object can indicate compute resources associated with one or more virtual warehouses (e.g., as illustrated in FIG. 3).

A resource monitor object configures monitoring the usage of compute resources used for executing the workload. For example, a resource monitor object can be used to monitor the usage of a virtual warehouse, and generate a notification if such usage is above a threshold.

The database account object indicates one or more databases of the data provider for replication. In some embodiments, the database account object may indicate databases that include account objects 602 listed in the manifest of RGO 600. Additionally, in some embodiments, the manifest of RGO 600 further includes allowed databases 604. For example, the list of allowed databases 604 can be a subset of databases indicated by the database account object in the list of account objects 602, where replication of account objects only from the allowed databases 604 can be performed based on the manifest of RGO 600.

In some embodiments, one or more allowed accounts 606 which are target accounts for replication of the account objects 602. In other embodiments, the manifest of RGO 600 further includes scheduling information 608 (e.g., a replication schedule period), which is used by the replication group manager to perform replication of the account objects 602 periodically, according to a replication schedule based on the scheduling information 608.

In some embodiments, the manifest of RGO 600 can further specify one or more integration objects (or integrations) such as security integrations, storage integrations, application programming interface (API) integrations, and notification integrations. An API integration object can be configured to store information about an HTTPS proxy service, including information about (a) a cloud platform provider (e.g., Amazon AWS); (b) a type of proxy service (in case the cloud platform provider offers more than one type of proxy service); and (c) identifier and access credentials for a cloud platform role that has sufficient privileges to use the proxy service. A notification integration object can be configured to provide an interface between the network-based database system 102 and a third-party cloud message queuing service. A security integration object can be configured to enable data providers to redirect users to an authorization page and generate access tokens (and optionally, refresh tokens) for accessing the network-based database system 102. A storage integration object can be configured to store a generated identity and access management (IAM) entity for external cloud storage, along with an optional set of allowed or blocked storage locations. The disclosure is not limited to the listed types of integration objects, and other integration objects may be used as well.

In some embodiments, the manifest of RGO 600 can further specify network policies, including policies indicating one or more IP addresses that can connect to an account of a data provider or a data consumer.

In an example embodiment, the manifest of RGO 600 can further specify at least one share object which encapsulates information required for sharing a database. For example, a share object can include: (a) privileges that grant access to the database and the schema containing the objects to share; (b) the privileges that grant access to the specific objects in the database; and (c) the accounts with which the database and its objects are shared. Once a database is created from a share, all the shared objects are accessible to users in the account.

Figure 7:
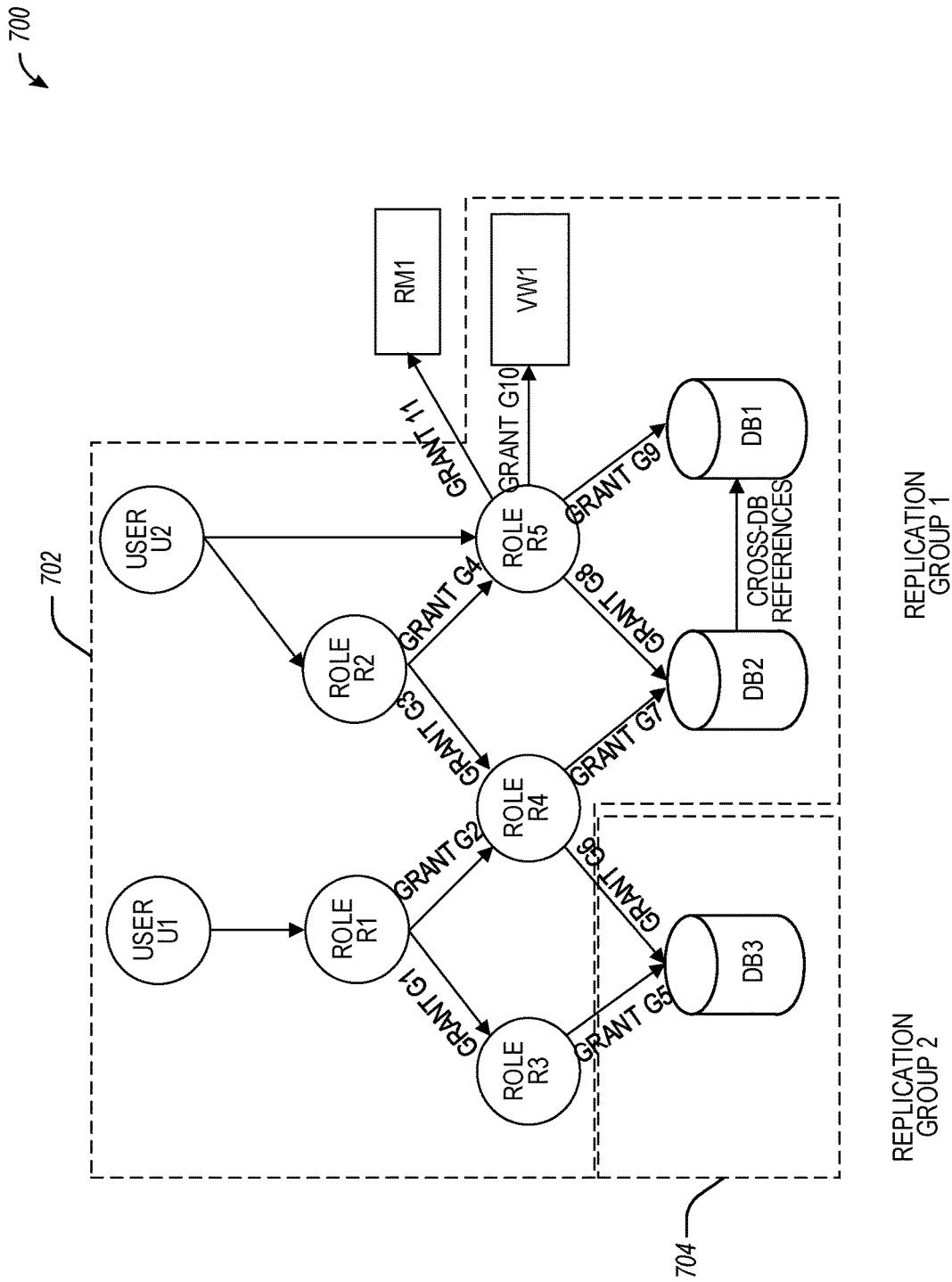
FIG. 7 illustrates example replication group objects specifying different account objects, in accordance with some embodiments of the present disclosure.

FIG. 7 illustrates diagram 700 of example replication group objects specifying different account objects, in accordance with some embodiments of the present disclosure.

As mentioned above, a replication group object can include account-entity domains such as users, roles, warehouses, databases, etc., and optionally include/exclude certain account domains, and also specific databases, schemas, and tables. This enables a near-zero knob experience for simple use cases for data providers or data consumers who want to replicate their entire account, and also enables advanced use cases such as filtering out certain databases, schemas, and tables for cost control, or independent replication/failover for databases that belong to different business units of a data provider or a data consumer.

Referring to FIG. 7, the replication group manager 132 can configure a first replication group object 702 and a second replication group object 704. Replication group object 702 includes users account objects U1 and U2 associated with corresponding roles account objects R1 and R2. Roles account objects R1 and R2 with additional roles account objects R3, R4, and R5. Roles R4 and R5 are associated with databases DB1 and DB2 as well as virtual warehouse VW1 via different grants. Since DB1 and DB2 have cross-database references (or database dependencies), both databases are included in the same replication group object. Roles R1-R5, databases DB1, DB2, and virtual warehouse VW1 are associated with grants G1, G2, G3, G4, G7, G8, G9, and G10 (as illustrated in FIG. 7). In some embodiments, database dependencies can be verified upon a refresh command and a notification can be provided to the client device communicating the replication request.

Replication group object 704 includes database DB3 which is associated with roles R3 and R4 via grants G5 and G6.

Figure 8:
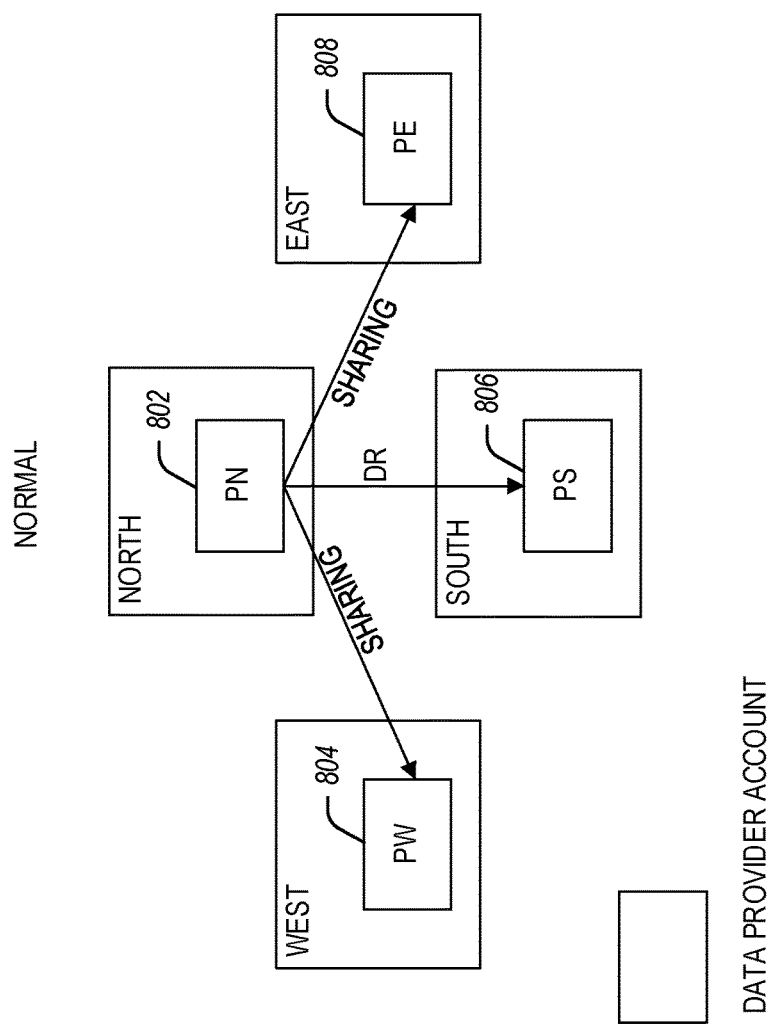
FIG. 8 and FIG. 9 illustrate example replication group object usage scenarios in connection with disaster recovery (DR) and data sharing, in accordance with some embodiments of the present disclosure.
Figure 9:
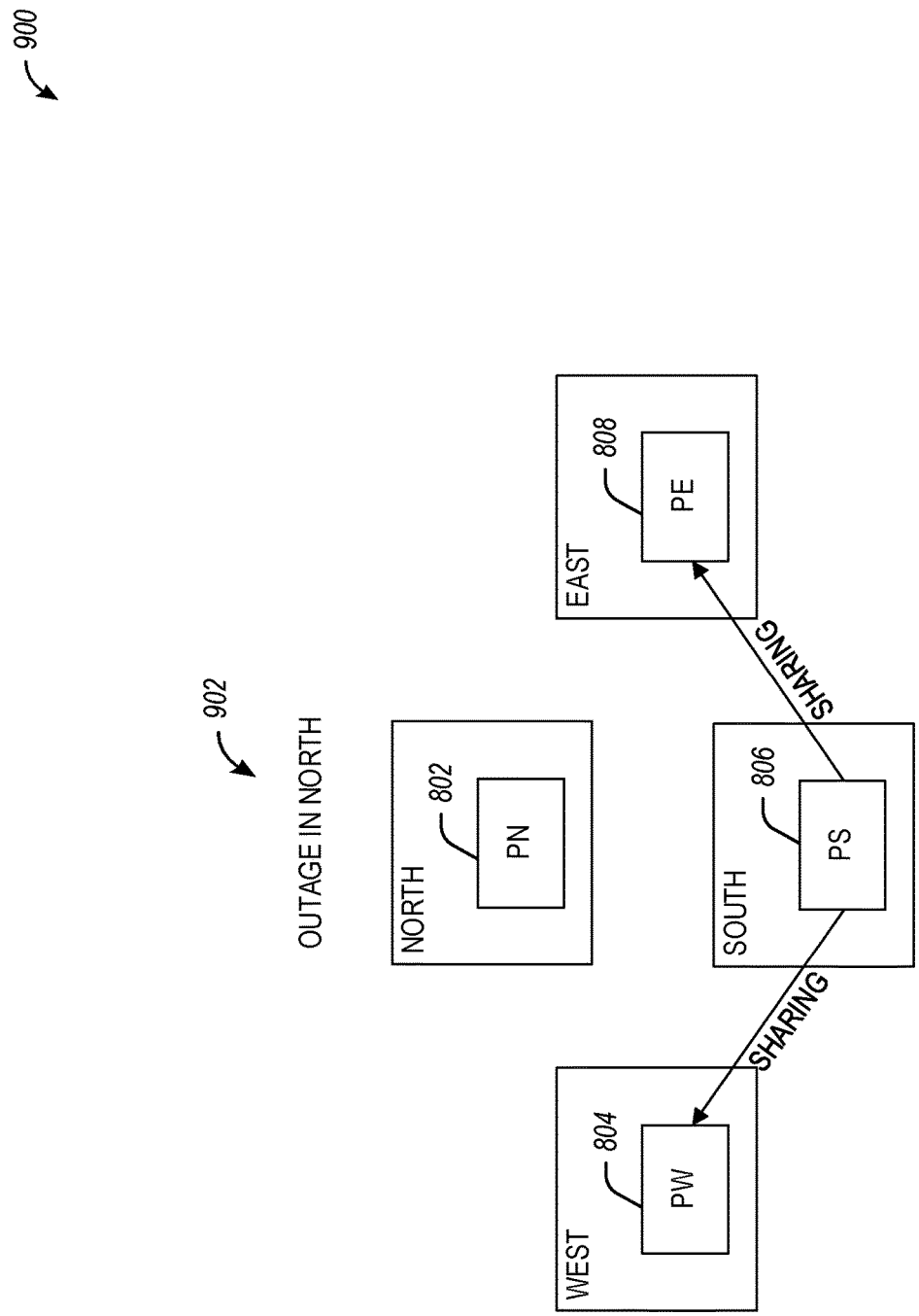

FIG. 8 and FIG. 9 illustrate example replication group object usage scenarios in connection with DR and data sharing, in accordance with some embodiments of the present disclosure. Referring to FIG. 8, use case 800 illustrates a replication of account objects using RGOs from a source (or primary) account 802 of a data provider into other data provider accounts 804, 806, and 808, with all accounts being deployed at different geographic locations. For example, an RGO from the source account 802 can be configured as a failover group object (FGO) and replicated to target account 806. In the event of a detected network failure event, DR can be initiated by promoting the target account 806 to a primary account (an example DR configuration is illustrated in FIG. 9). As illustrated in FIG. 8, account objects replication from the source account 802 to target accounts 804 and 808 is used for global data sharing and generating read replicas of account objects using the RGO. The RGO used for data object replication from source account 802 to target account 806 can be configured as FGO so that target account 806 can be promoted to a primary/source account in the event of a DR, which is illustrated in FIG. 9.

Referring to FIG. 9, illustrates a DR event 900 where network outage is detected in the North location 902 where source account 802 is deployed. Since account 802 was previously replicated using a failover group object into account 806, account 806 can be promoted to a primary/source account which can initiate account object replication using RGOs into accounts 804 and 808 for purposes of global data sharing.

In some embodiments, a failover group object can be failed over to other accounts for DR. An RGO can be configured as FGO by setting a FAILOVER_ALLOWED_TO_ACCOUNTS property in the manifest of the RGO. In some aspects, zero or more failover group objects can be created for an account. An example manifest of an RGO configured as FGO is illustrated in Table 1 below.

TABLE 1

CREATE [OR REPLACE] REPLICATION GROUP [IF NOT EXISTS] <name>
INCLUDE { objectTypes | ALL [ OBJECTS ] }
[ ALLOWED_DATABASES = (<database>, <database>, .. ) ]
[ REPLICATION_ALLOWED_TO_ACCOUNTS = (<account>, <account>)]
[ FAILOVER_ALLOWED_TO_ACCOUNTS = (account, <account>)]
[ SCHEDULE = ' <num> MINUTE ' ]
[ COMMENT = '<string_literal>' ]

In other embodiments, an RGO can be configured as FGO by calling the SQL command CREATE FAILOVER GROUP, which is discussed herein below.

In some aspects, the RGOs used for replicating data objects for data sharing into accounts 804 and 808 can enable read workloads in such accounts and may not be failed over. An example manifest of an RGO used for global data sharing is illustrated in Table 2 below.

TABLE 2

CREATE [OR REPLACE] REPLICATION GROUP [IF NOT EXISTS] <name>
INCLUDE { objectTypes | ALL [ OBJECTS ] }
[ ALLOWED_DATABASES = (<database>, <database>, .. ) ]
[ REPLICATION_ALLOWED_TO_ACCOUNTS = (<account>, <account>)]
[ SCHEDULE = ' <num> MINUTE ' ]
[ COMMENT = '<string_literal>' ]

In some embodiments, database replication based on RGOs can be used for DR scenario for data sharing. For DR, a main (or primary) deployment region can failover to a new deployment region that runs all the workloads of the main region (where the workloads of the main region can be replicated into the new deployment region using FGOs). The new deployment region can be promoted to a primary region, and workloads can be executed from the primary region. For an FGO, the account specified in the manifest is allowed for promotion from a secondary to a primary account designation. For an RGO, the specified account is allowed only for a secondary account designation and cannot be used for failover.

In example embodiments, the following configurations may be used in connection with failover group objects. An example manifest of an RGO configured as a failover group object in a source account is illustrated in Table 3 below.

TABLE 3

CREATE FAILOVER GROUP [IF NOT EXISTS] RG1
OBJECT_TYPES = USERS, ROLES, WAREHOUSES, RESOURCE MONITORS
ALLOWED_ACCOUNTS = [ORG.]ACCT2
[IGNORE EDITION CHECK]

An example manifest of an RGO configured as a failover group object in a target account is illustrated in Table 4 below.

TABLE 4

CREATE FAILOVER GROUP [IF NOT EXISTS] RG1
AS REPLICA OF [ORG.]ACCT1.RG1;

In some embodiments, the following SQL command can be used to list available failover group objects:
SHOW [FAILOVER] REPLICATION GROUPS [IN <account> ACCOUNT].

In some embodiments, the following SQL command can be used for refreshing a secondary failover group object in a target account:
ALTER FAILOVER GROUP [IF EXISTS] RG1 REFRESH.

In some embodiments, the following SQL command can be used for failing over a failover group object:
ALTER FAILOVER GROUP [IF EXISTS] RG1 PRIMARY.

In some embodiments, the following SQL command can be used for altering a failover group object by adding an account:
ALTER FAILOVER GROUP [IF EXISTS] RG1
ADD [ORG.] ACCT3 TO ALLOWED_ACCOUNTS.

In some embodiments, the following SQL command can be used for altering a failover group object by removing an account:
ALTER FAILOVER GROUP [IF EXISTS] RG1
REMOVE [ORG.] ACCT2 FROM ALLOWED_ACCOUNTS.

In some embodiments, the following SQL command can be used for dropping a primary or a secondary failover group object:
DROP FAILOVER GROUP [IF EXISTS] RG1.

In some embodiments, the following SQL commands in Table 5 can be used for the task to refresh a secondary failover group on a target account:

TABLE 5

USE DATABASE UTIL_DB;
CREATE TASK RG_REFRESH
WAREHOUSE = PROD_WH
SCHEDULE = 15 MINUTE
AS
ALTER FAILOVER GROUP RG1 REFRESH;

In some embodiments, the example manifest in Table 6 can be used to create a failover group object for multi-database replication.

TABLE 6

CREATE FAILOVER GROUP [IF NOT EXISTS] RG1
OBJECT_TYPES = USERS, ROLES
, WAREHOUSES
, RESOURCE MONITORS
, DATABASES
[ ALLOWED_DATABASES = DB1 ]
ALLOWED_ACCOUNTS = ORG.ACCT2

In aspects when OBJECT_TYPES=ALL, the manifest specifies and includes all available objects. However, the objects can be filtered by specifying a specific database in the manifest of the RGO (e.g., specifying ALLOWED_DATABASES=DB1 which indicates that the object types only from database DB1 can be used for data replication).

In some embodiments, the example manifest in Table 7 can be used to create a primary failover group object for multi-database replication.

TABLE 7

CREATE FAILOVER GROUP RG2
OBJECT_TYPES = DATABASES
ALLOWED_DATABASES = DB2, DB3
ALLOWED_ACCOUNTS = ORG.ACCT2

In some embodiments, the example manifests in Table 8 can be used to create multiple failover group objects for multi-database replication.

TABLE 8

CREATE FAILOVER GROUP [IF NOT EXISTS] RG1
OBJECT_TYPES = USERS, ROLES
, WAREHOUSES
, RESOURCE MONITORS
, DATABASES
ALLOWED_DATABASES = DB1
ALLOWED_ACCOUNTS = ORG.ACCT2
ALLOWED_ACCOUNTS = ORG.ACCT2
CREATE FAILOVER GROUP [IF NOT EXISTS] RG2
OBJECT_TYPES = DATABASES
ALLOWED_DATABASES = DB2, DB3
ALLOWED_ACCOUNTS = ORG.ACCT2
ALLOWED_ACCOUNTS = ORG.ACCT2

In some embodiments, the example manifest in Table 9 can be used to create a linked secondary failover group object for multi-database replication on a target account.

TABLE 9

CREATE FAILOVER GROUP [IF NOT EXISTS]
AS REPLICA OF [ORG.]ACCT1.RG1;

In some embodiments, the following SQL command can be used for refreshing a secondary failover group object:
ALTER FAILOVER GROUP [IF EXISTS] RG1 REFRESH.

In some embodiments, the following SQL commands can be used for altering a primary failover group object to remove all databases:
ALTER FAILOVER GROUP FG1
SET ALLOWED_DATABASES=NULL.

In some embodiments, the following SQL commands can be used for altering a primary failover group object to move databases or shares across groups atomically:
ALTER FAILOVER GROUP FG1
MOVE DATABASES DB1 TO FAILOVER GROUP FG2.

In some embodiments, a manifest of a replication group object can include scheduling information that can be used for performing the replication of account objects specified in the manifest according to a replication schedule.

In some embodiments, to create a primary failover group with a replication schedule, the following configurations for the scheduling information in the manifest can be used: (a) Support number of minutes; (b) Support cron expression and time zone (e.g., the same subset of standard cron); (c) Next refresh fails is skipped if the previous one is still running; (d) Next refresh will be scheduled as the later of (next scheduled time, when the current refresh finishes); and (e) Failover fails if a refresh is still running.

In some embodiments, the example manifests in Table 10 can be used to create a primary failover group with a replication schedule.

TABLE 10

CREATE FAILOVER GROUP [IF NOT EXISTS] RG1
OBJECT_TYPES = USERS, ROLES, WAREHOUSES, RESOURCE
MONITORS,
DATABASES
ALLOWED_DATABASES = DB1
ALLOWED_ACCOUNTS = ORG.ACCT2
REPLICATION_SCHEDULE = '60 MINUTE'
CREATE FAILOVER GROUP [IF NOT EXISTS] RG1
INCLUDE USERS, ROLES, WAREHOUSES, RESOURCE
MONITORS, DATABASES
ALLOWED_DATABASES = DB1
ALLOWED_ACCOUNTS = ORG.ACCT2
REPLICATION_SCHEDULE = 'USING CRON 0 9-17 * * SUN
America/Los_Angeles'

In some embodiments, the following SQL command can be used for suspending replication to enable a graceful failover:
ALTER FAILOVER GROUP RG1 SUSPEND.

In some embodiments, the following SQL command can be used for resuming replication to enable a graceful failover:
ALTER FAILOVER GROUP RG1 RESUME.

In some embodiments, the following SQL command can be used for altering a replication schedule for a group:
ALTER FAILOVER GROUPS [IF NOT EXISTS] RG1 SET REPLICATION_SCHEDULE='5 MINUTE'.

FIG. 10-FIG. 17 illustrate example replication group object configurations and usages, in accordance with some embodiments of the present disclosure.

Figure 10:
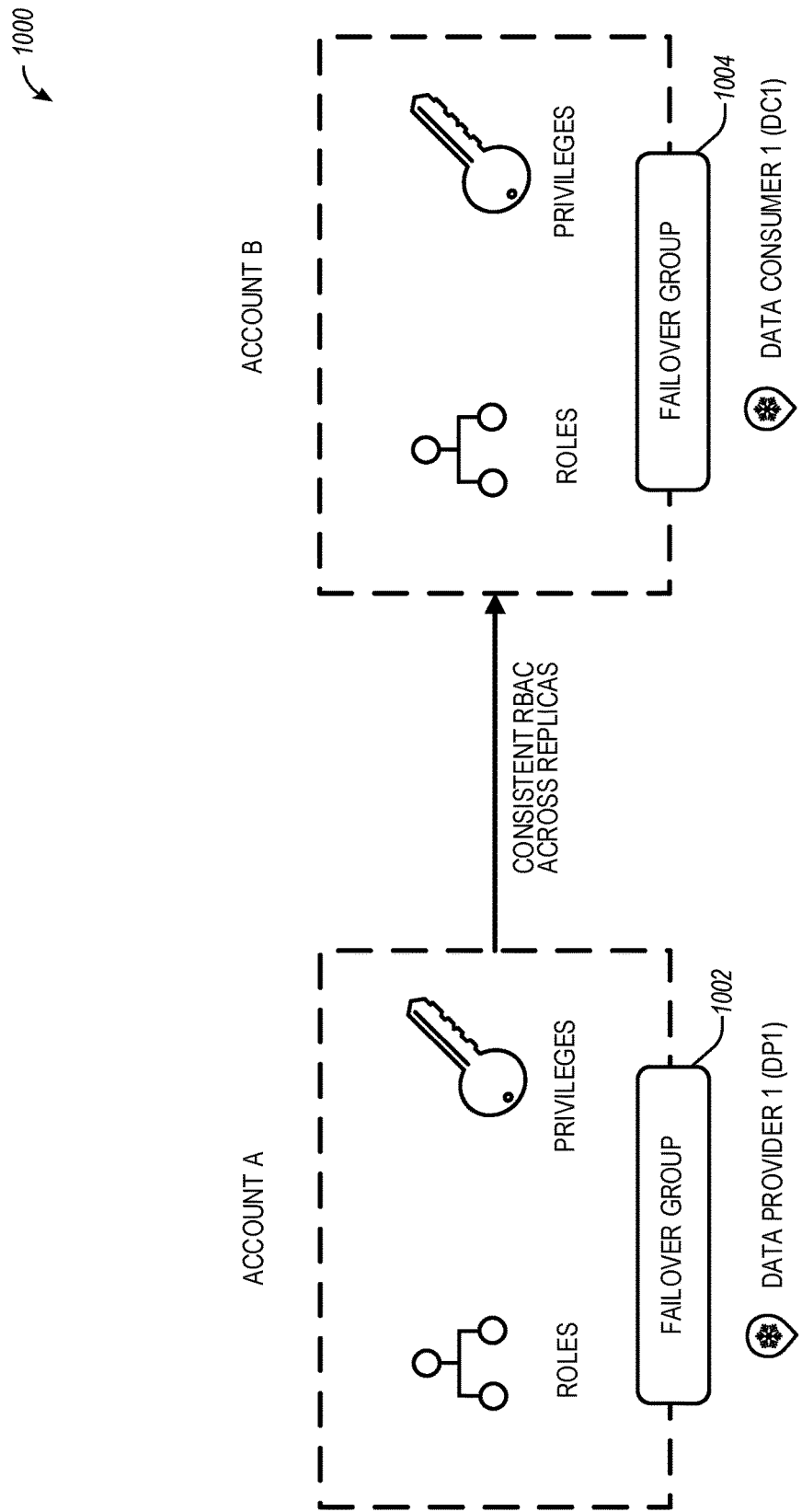
FIGS. 10-17 illustrate example replication group object configurations and usages, in accordance with some embodiments of the present disclosure.

Referring to FIG. 10, there is illustrated a use case scenario 1000 where a failover group object 1002 in account A of data provider 1 (DP1) is replicated as failover group object 1004 in account B of data consumer 1 (DC1). As illustrated in FIG. 10, roles and privileges associated with failover group object 1002 are replicated as corresponding roles and privileges associated with failover group object 1004 to achieve consistent role-based access control across replicas.

Figure 11:
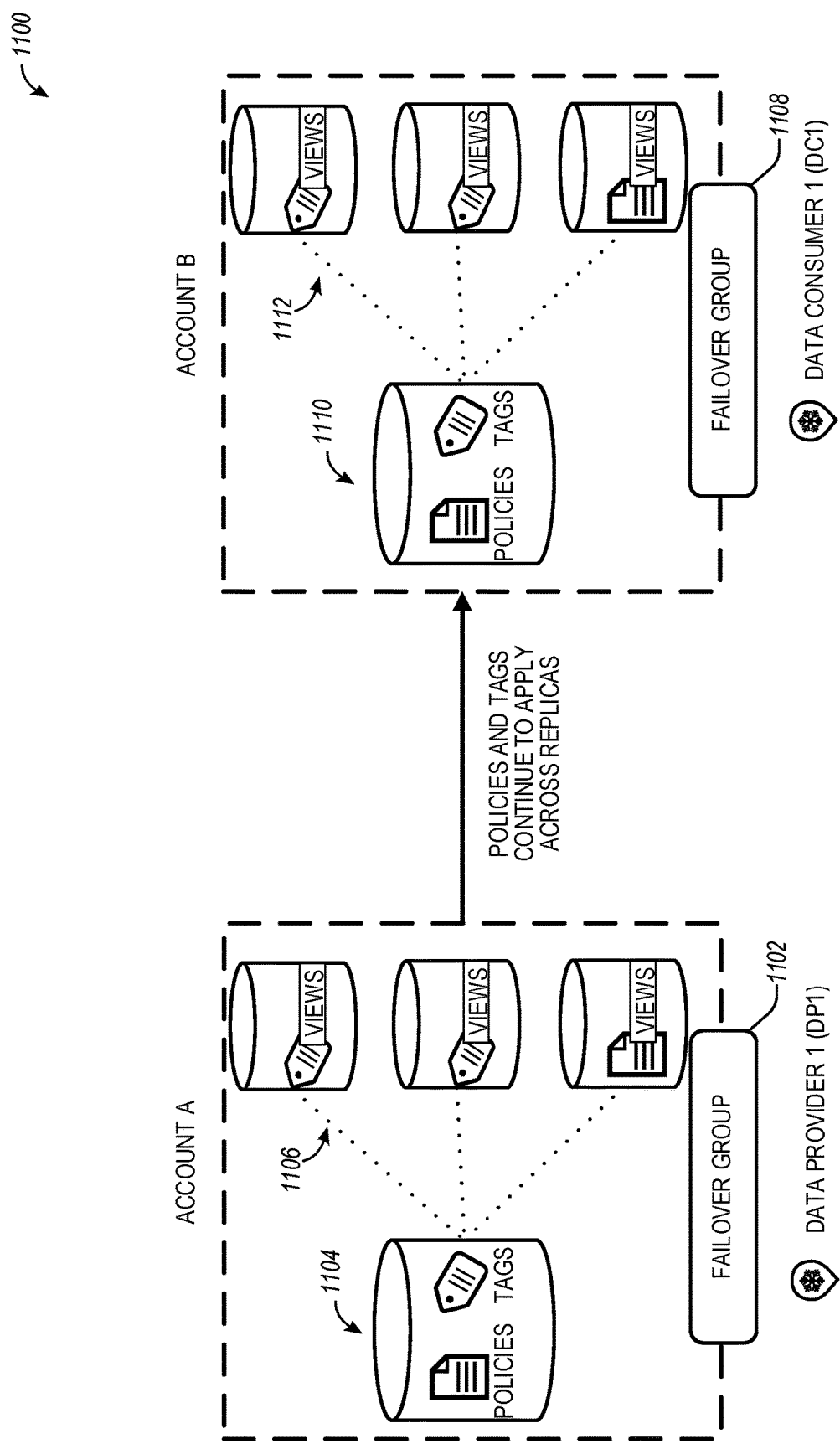

Referring to FIG. 11, there is illustrated a use case scenario 1100 where a failover group object 1102 in account A of DP1 is replicated as failover group object 1108 in account B of DC1. As illustrated in FIG. 11, the manifest of failover group object 1102 specifies database 1104 which includes policies (e.g., masking, row access, or other policies) and tags. The tags are applied to multiple views 1106 in other databases. In some embodiments, the manifest of failover group object 1102 will include database 1104 as well as the related databases associated with views 1106. In this regard, the replicated failover group object 1108 would also include manifest specifying corresponding databases 1110 as well as databases corresponding to the views 1112 so that the policies and tags continue to apply across replicas.

Figure 12:
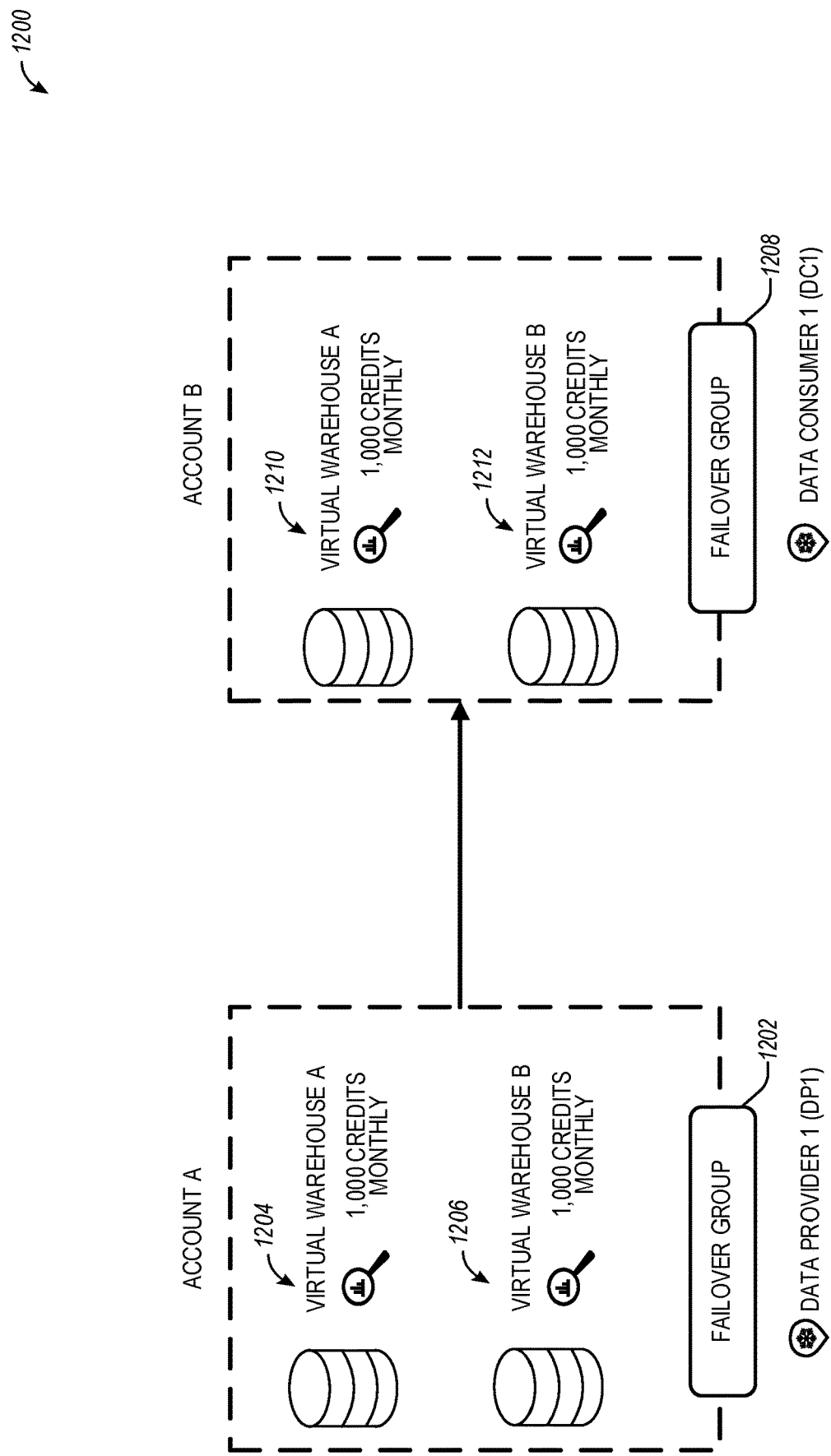

Referring to FIG. 12, there is illustrated a use case scenario 1200 where a failover group object 1202 in account A of DP1 is replicated as failover group object 1208 in account B of DC1. As illustrated in FIG. 12, the manifest of FGO 1202 includes warehouse objects 1204 and 1206 with corresponding resource monitoring objects, which are replicated as warehouse objects 1210 and 1212 in FGO 1208. In some embodiments, the virtual warehouses specified by the warehouse objects are replicated in a suspended state the very first time and can be resumed when needed. The resource monitors are also replicated and can be configured to continue to govern the consumption of compute resources on the secondary accounts (e.g., account B) of DC1.

Figure 13:
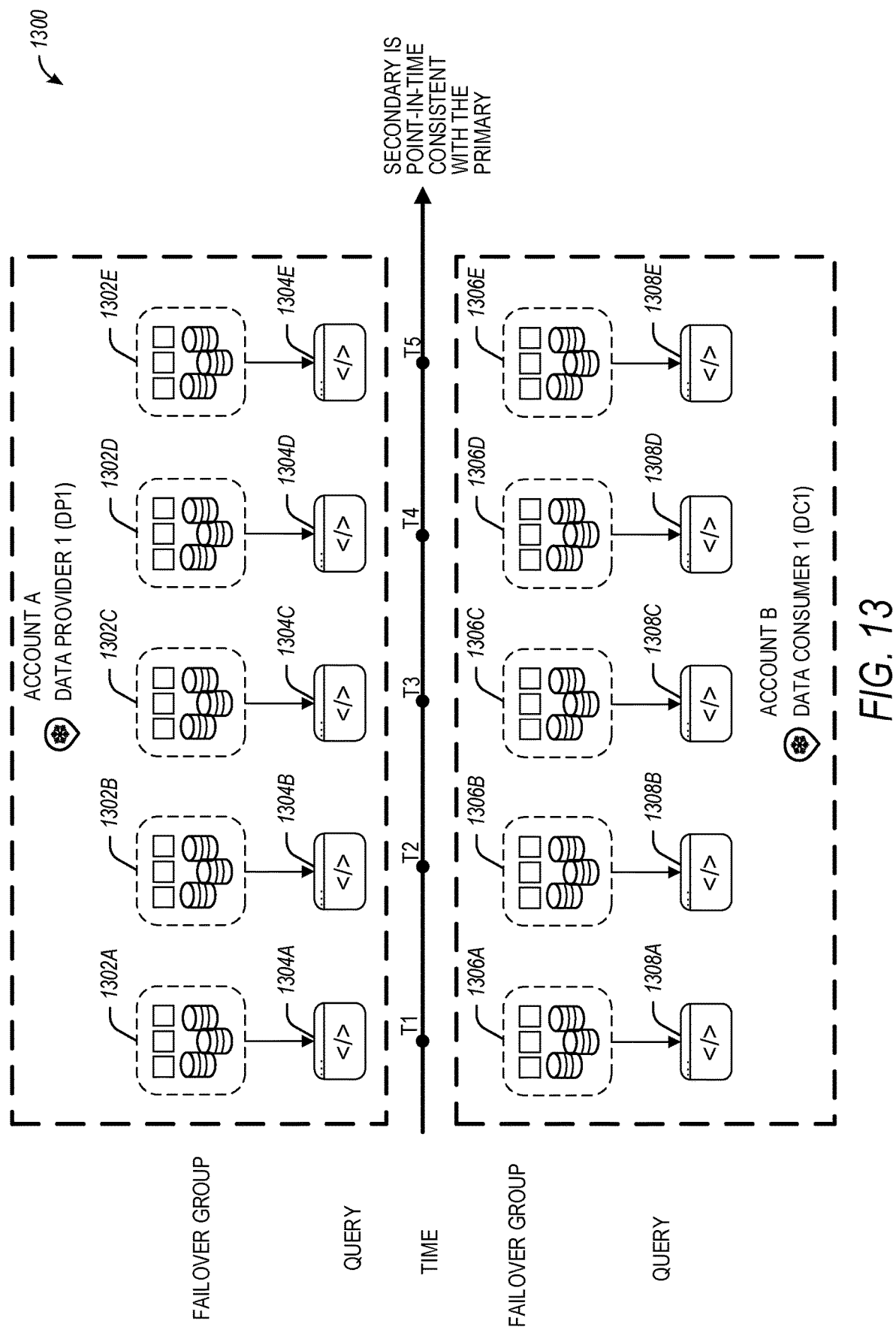

Referring to FIG. 13, there is illustrated a use case scenario 1300 where failover group objects 1302A-1302E associated with corresponding queries 1304A-1304E in account A of DP1 are replicated at corresponding time instances T1-T5 as corresponding failover group objects 1306A-1306E associated with corresponding queries 1308A-1308E in account B of DC1. In this regard, query results obtained in the secondary account (e.g., account B) are point-in-time consistent with query results obtained in the primary account (e.g., account A).

Figure 14:
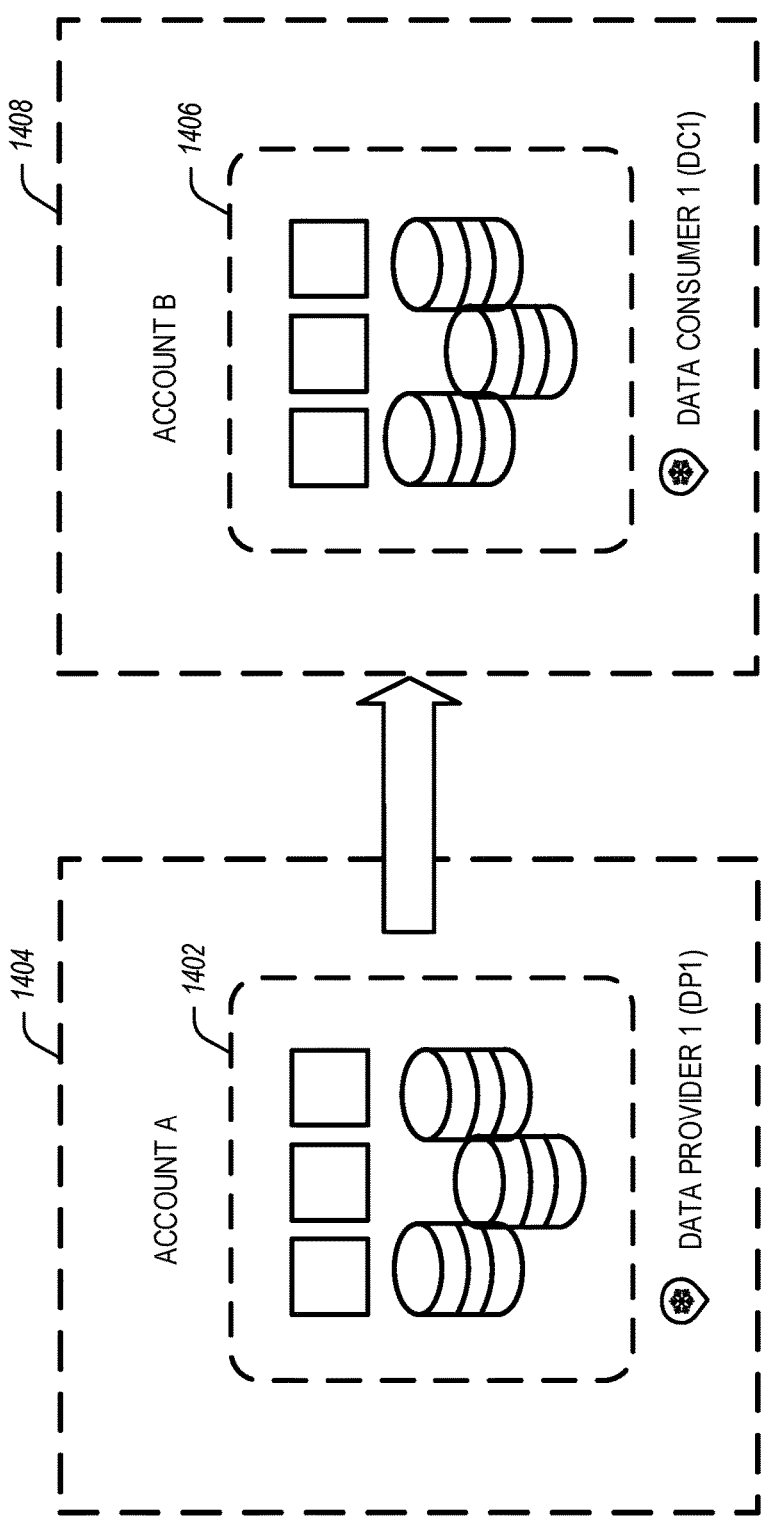

Referring to FIG. 14, there is illustrated a use case scenario 1400 where a replication group object 1402 in account 1404 of DP1 is replicated as a replication group object 1406 in account 1408 of DC1. In some embodiments, the replication is performed at a schedule, without a need for creating and managing individual replication tasks.

Figure 15:
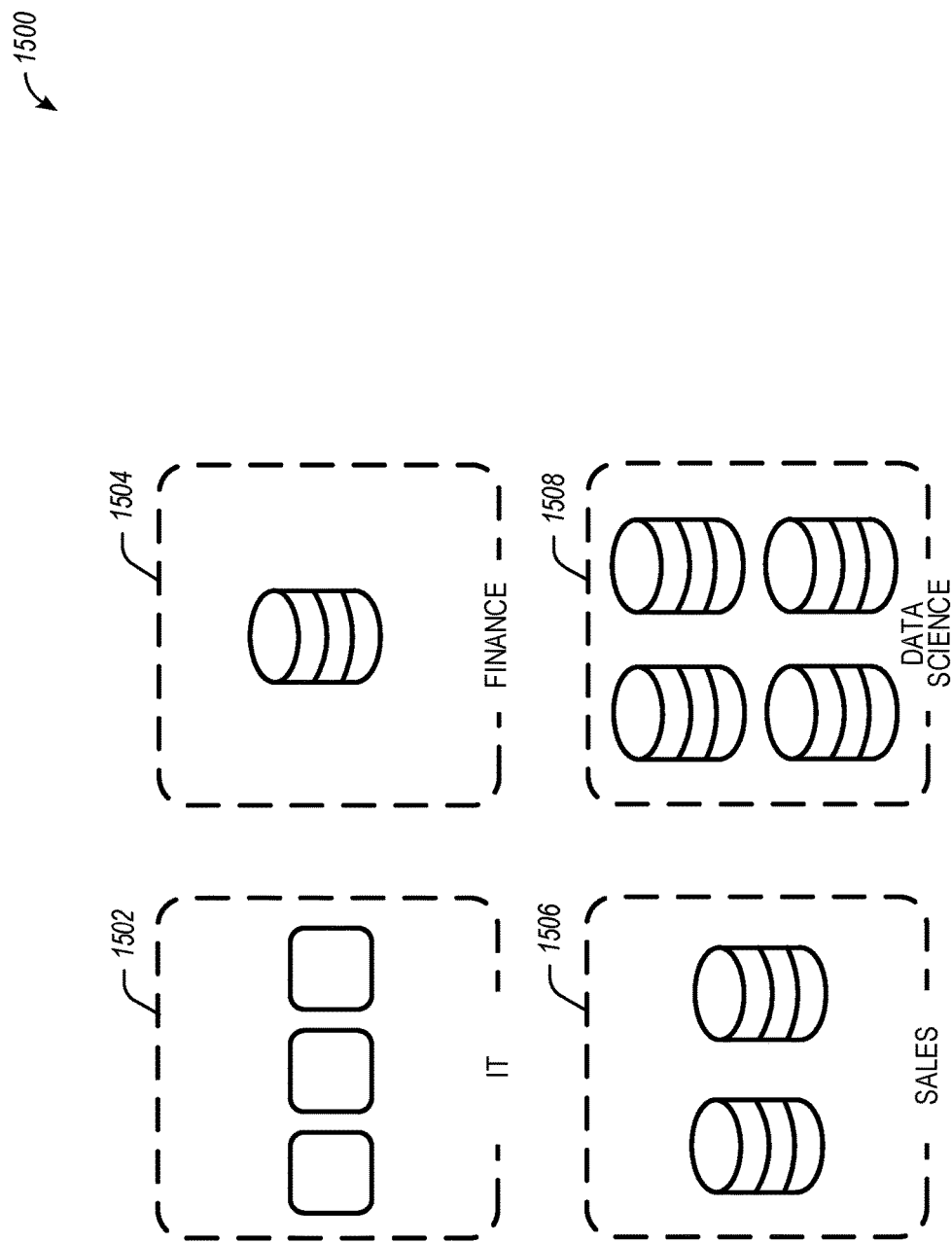

Referring to FIG. 15, there is illustrated a use case scenario 1500 where account objects from a single replication group object (e.g., such as replication group object 1402 in FIG. 14) can be grouped in separate replication group objects 1502, 1504, 1506, and 1508 for flexibility. For example, account objects associated with different business units of a data provider or a data consumer (e.g., IT, finance, sales, and data science) can be grouped into the corresponding separate replication group objects 1502-1508.

Figure 16:
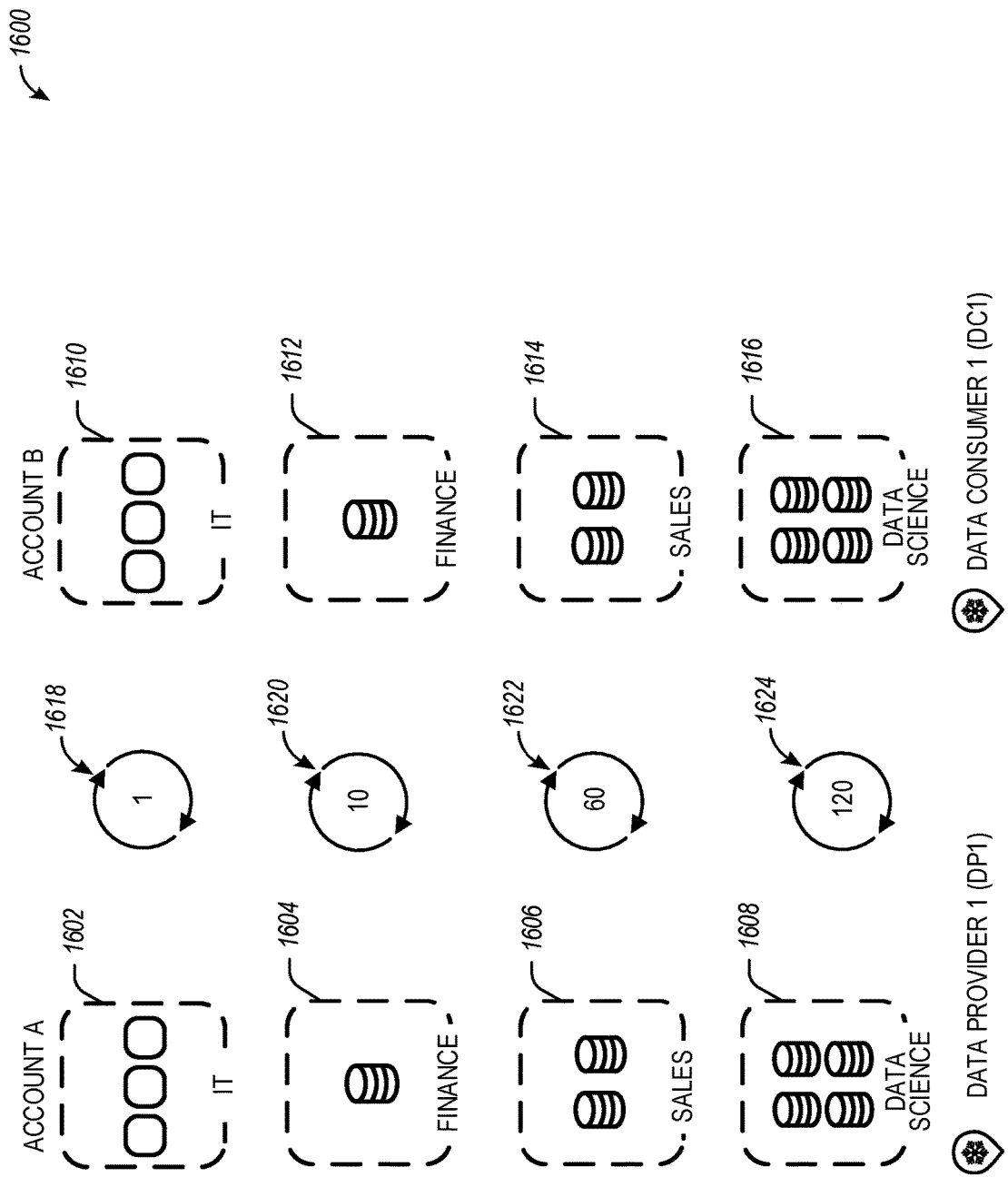

Referring to FIG. 16, there is illustrated a use case scenario 1600 where replication group objects 1602, 1604, 1606, and 1608 are replicated from account A of DP1 to corresponding replication group objects 1610, 1612, 1614, and 1616 in account B of DC1. Additionally, the manifests of replication group objects 1602, 1604, 1606, and 1608 are configured to specify corresponding scheduling information 1618, 1620, 1622, and 1624 for setting individual replication schedules for each of the replication group objects 1602-1608.

Figure 17:
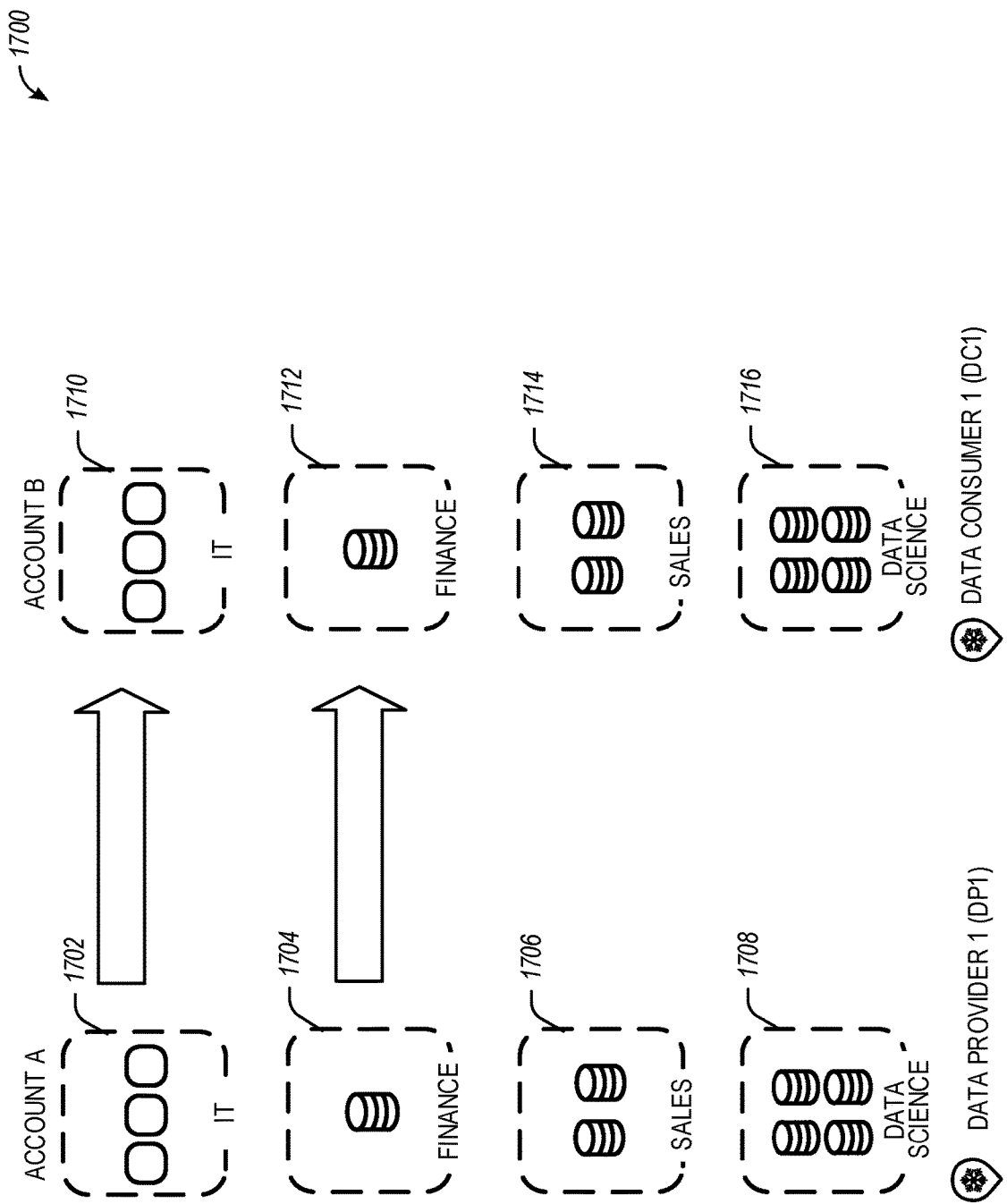

Referring to FIG. 17, there is illustrated a use case scenario 1700 where failover group objects 1702, 1704, 1706, and 1708 are replicated from account A of DP1 to corresponding failover group objects 1710, 1712, 1714, and 1716 in account B of DC1. In some embodiments, multiple failovers from account A to account B using one or more of the failover group objects 1710, 1712, 1714, and 1716 can take place separately, on-demand, or at a predefined schedule (e.g., FIG. 17 illustrates failover using only failover group objects 1710 and 1712).

Figure 18:
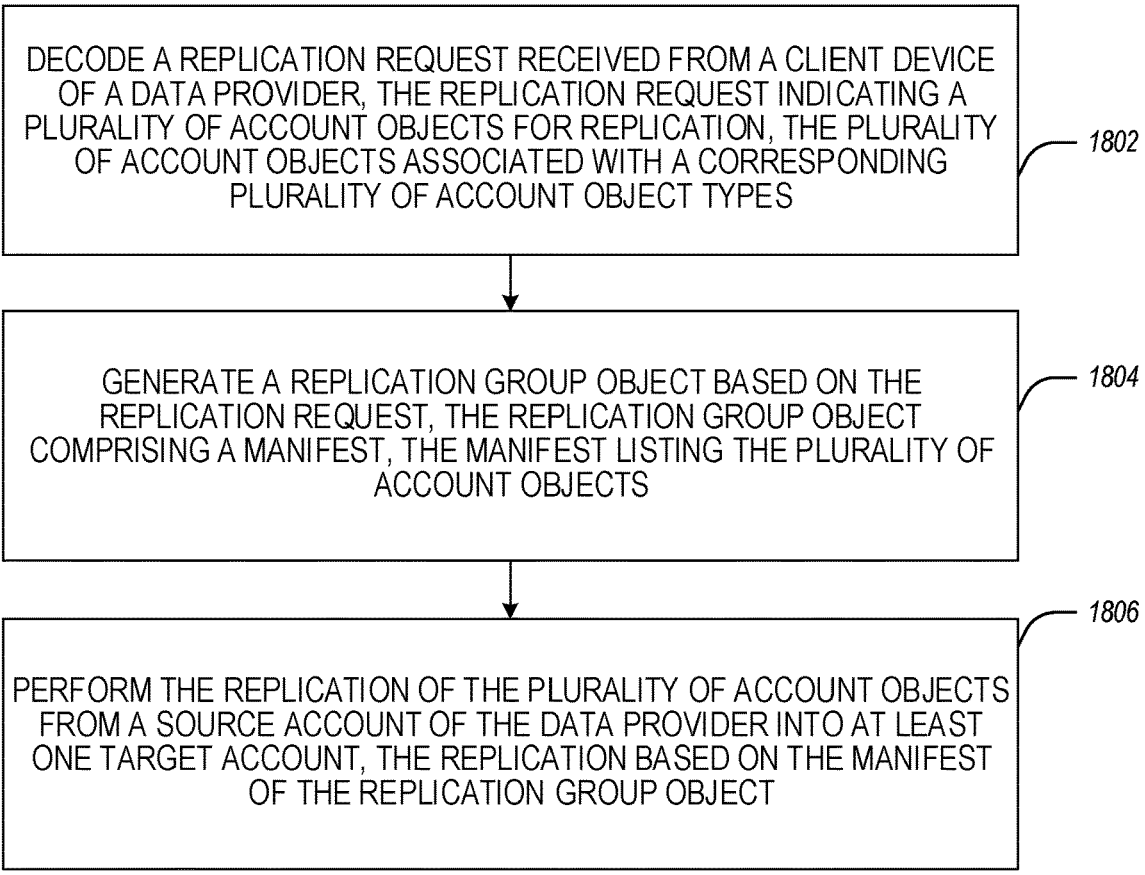
FIG. 18 is a flow diagram illustrating operations of a database system in performing a method for configuring a replication group object, in accordance with some embodiments of the present disclosure.

FIG. 18 is a flow diagram illustrating operations of a database system in performing a method 1800 for configuring a replication group object, in accordance with some embodiments of the present disclosure. Method 1800 may be embodied in computer-readable instructions for execution by one or more hardware components (e.g., one or more processors) such that the operations of the method 1800 may be performed by components of the network-based database system 102, such as a network node (e.g., replication group manager 132 executing on a network node of the compute service manager 108) or computing device (e.g., client device 114) which may be implemented as machine 1900 of FIG. 19 and may be configured with an application connector performing the disclosed functions. Accordingly, method 1800 is described below, by way of example with reference thereto. However, it shall be appreciated that method 1800 may be deployed on various other hardware configurations and is not intended to be limited to deployment within the network-based database system 102.

At operation 1802, a replication request received from a client device of a data provider is decoded. The replication group manager 132 decodes replication request 138, received from client device 114 via network 106. The replication request 138 indicates a plurality of account objects (e.g., account objects 602) for replication. The plurality of account objects can be associated with a corresponding plurality of account object types.

At operation 1804, an RGO is generated based on the replication request. For example, the replication group manager 132 generates RGO (e.g., RGO 134 which can be the same as RGO 600). The RGO includes a manifest (e.g., manifest 136) listing the plurality of account objects.

At operation 1806, a replication of the plurality of account objects from a source account of the data provider into at least one target account is performed based on the manifest of the RGO. For example, replication of the account objects 602 specified by the manifest of RGO 600 is performed using one or more allowed databases 604, allowed accounts 606, and scheduling information 608 (all specified within the manifest of the replication group object 600)

In some embodiments, the replication request further includes the source account and the at least one target account. Additionally, the manifest of the RGO is configured to further include the at least one target account.

In some aspects, the plurality of account object types comprises at least one of (a) a users account object type; (b) a roles account object type; (c) a warehouse object type; (d) a resource monitor object type; and (e) a database account object type. A users account object of the users account object type lists users authorized to access the at least one target account. A roles account object of the roles account object type configures privileges for the users to access the at least one target account. A warehouse object of the warehouse object type indicates compute resources for executing a workload associated with one or more databases of the data provider. A resource monitor object of the resource monitor object type configures monitoring usage of the compute resources. A database account object of the database account object type indicates one or more databases of the data provider.

In some embodiments, replication request 138 further includes the database account object and a list of at least one allowed database. The at least one allowed database can be a subset of the one or more databases. The manifest of the replication group object (e.g., RGO 600) is configured to further include the database account object and the list of allowed databases (e.g., the list of allowed databases 604 in RGO 600).

In some aspects, performing the replication of the plurality of account objects further includes performing a replication of the allowed databases listed in the manifest of the replication group object.

In some embodiments, a refresh command for the replication group object is detected subsequent to the replication of the allowed databases. Dependencies of replicated versions of the allowed databases are verified. A notification is generated based on the verifying.

In some aspects, replication request 138 further includes scheduling information. The manifest of the replication group object (e.g., RGO 600) can be configured to further include the scheduling information (e.g., scheduling information 608).

In some embodiments, the replication of the plurality of account objects (e.g., account objects 602) is performed according to a replication schedule which is configured based on the scheduling information (e.g., scheduling information 608).

In some aspects, the RGO is configured as a failover group object based on revising the manifest to include an indication that the at least one target account is allowed for failover. In some embodiments, a network disaster event associated with the source account (e.g., account 802) of the data provider is detected. A failover of the source account is performed to the at least one target account (e.g., account 806) based on the detecting.

Figure 19:
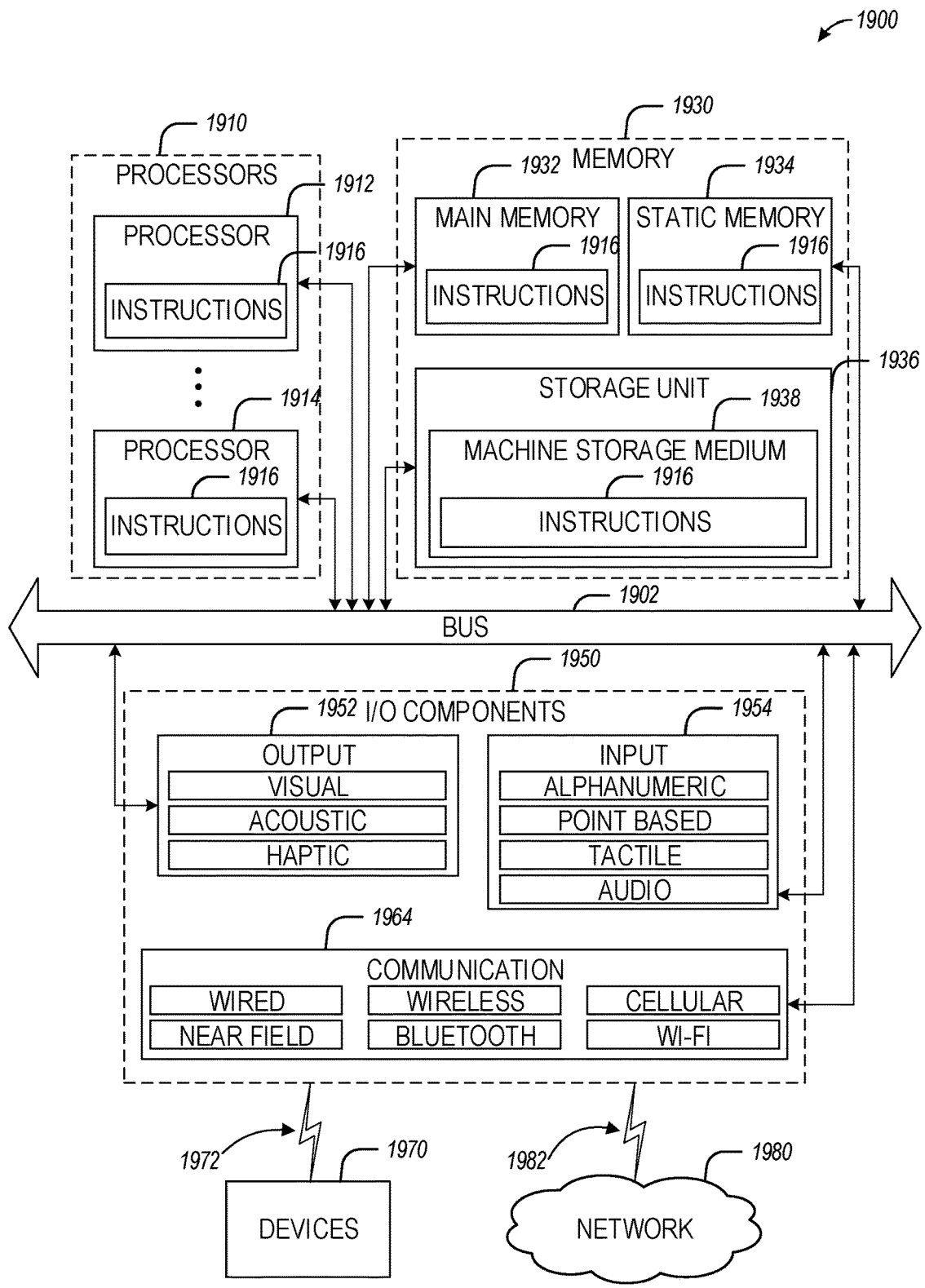
FIG. 19 illustrates a diagrammatic representation of a machine in the form of a computer system within which a set of instructions may be executed for causing the machine to perform any one or more of the methodologies discussed herein, in accordance with some embodiments of the present disclosure.

FIG. 19 illustrates a diagrammatic representation of a machine 1900 in the form of a computer system within which a set of instructions may be executed for causing the machine 1900 to perform any one or more of the methodologies discussed herein, according to an example embodiment. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. For example, instructions 1916 may cause machine 1900 to execute any one or more operations of method 1800 (or any other technique discussed herein, for example in connection with FIG. 4-FIG. 18). As another example, instructions 1916 may cause machine 1900 to implement one or more portions of the functionalities discussed herein. In this way, instructions 1916 may transform a general, non-programmed machine into a particular machine 1900 (e.g., the client device 114, the compute service manager 108, or a node in the execution platform 110) that is specially configured to carry out any one of the described and illustrated functions in the manner described herein. In yet another embodiment, instructions 1916 may configure the client device 114, the compute service manager 108, and/or a node in the execution platform 110 to carry out any one of the described and illustrated functions in the manner described herein.

In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

Machine 1900 includes processors 1910, memory 1930, and input/output (I/O) components 1950 configured to communicate with each other such as via a bus 1902. In some example embodiments, the processors 1910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1912 and a processor 1914 that may execute the instructions 1916. The term "processor" is intended to include multi-core processors 1910 that may comprise two or more independent processors (sometimes referred to as "cores") that may execute instructions 1916 contemporaneously. Although FIG. 19 shows multiple processors 1910, the machine 1900 may include a single processor with a single core, a single processor with multiple cores (e.g., a multi-core processor), multiple processors with a single core, multiple processors with multiple cores, or any combination thereof.

The memory 1930 may include a main memory 1932, a static memory 1934, and a storage unit 1936, all accessible to the processors 1910 such as via the bus 1902. The main memory 1932, the static memory 1934, and the storage unit 1936 store the instructions 1916 embodying any one or more of the methodologies or functions described herein. The instructions 1916 may also reside, completely or partially, within the main memory 1932, within the static memory 1934, within machine storage medium 1938 of the storage unit 1936, within at least one of the processors 1910 (e.g., within the processor's cache memory), or any suitable combination thereof, during execution thereof by the machine 1900.

The I/O components 1950 include components to receive input, provide output, produce output, transmit information, exchange information, capture measurements, and so on. The specific I/O components 1950 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 may include a network interface component or another suitable device to interface with the network 1980. In further examples, the communication components 1964 may include wired communication components, wireless communication components, cellular communication components, and other communication components to provide communication via other modalities. The device 1970 may be another machine or any of a wide variety of peripheral devices (e.g., a peripheral device coupled via a universal serial bus (USB)). For example, as noted above, machine 1900 may correspond to any one of the client device 114, the compute service manager 108, or the execution platform 110, and the devices 1970 may include the client device 114 or any other computing device described herein as being in communication with the network-based database system 102 or the cloud storage platform 104.

The various memories (e.g., 1930, 1932, 1934, and/or memory of the processor(s) 1910 and/or the storage unit 1936) may store one or more sets of instructions 1916 and data structures (e.g., software) embodying or utilized by any one or more of the methodologies or functions described herein. These instructions 1916, when executed by the processor(s) 1910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1916 may be transmitted or received over the network 1980 using a transmission medium via a network interface device (e.g., a network interface component included in the communication components 1964) and utilizing any one of several well-known transfer protocols (e.g., hypertext transfer protocol (HTTP)). Similarly, instructions 1916 may be transmitted or received using a transmission medium via the coupling 1972 (e.g., a peer-to-peer coupling or another type of wired or wireless network coupling) to the device 1970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1916 for execution by the machine 1900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 1800 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a replication request received from a client device of a data provider, the replication request indicating a plurality of account objects for replication, the plurality of account objects associated with a corresponding plurality of account object types; generating a replication group object based on the replication request, the replication group object comprising a manifest, the manifest listing the plurality of account objects; and performing the replication of the plurality of account objects from a source account of the data provider into at least one target account, the replication based on the manifest of the replication group object.

In Example 2, the subject matter of Example 1 includes subject matter where the replication request further includes the source account and the at least one target account, and wherein the instructions further cause the at least one hardware processor to perform operations comprising: configuring the manifest of the replication group object to further include the at least one target account.

In Example 3, the subject matter of Examples 1-2 includes subject matter where the plurality of account object types comprises at least one of a users account object type, wherein a users account object of the users account object type lists users authorized to access the at least one target account; a roles account object type, wherein a roles account object of the roles account object type configures privileges for the users to access the at least one target account; a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

In Example 4, the subject matter of Examples 1-3 includes subject matter where the plurality of account object types comprises a database account object type, and wherein a database account object of the database account object type indicates one or more databases of the data provider.

In Example 5, the subject matter of Example 4 includes subject matter where the replication request further includes the database account object and a list of at least one allowed database, the at least one allowed database being a subset of the one or more databases, and wherein the instructions further cause the at least one hardware processor to perform operations comprising: configuring the manifest of the replication group object to further include the database account object and the list of allowed databases.

In Example 6, the subject matter of Example 5 includes subject matter where the instructions causing performing the replication of the plurality of account objects further cause the at least one hardware processor to perform operations comprising: performing a replication of the allowed databases listed in the manifest of the replication group object.

In Example 7, the subject matter of Example 6 includes subject matter where the instructions further cause the at least one hardware processor to perform operations comprising: detecting subsequent to the replication of the allowed databases, a refresh command for the replication group object; verifying dependencies of replicated versions of the allowed databases; and generating a notification based on the verifying.

In Example 8, the subject matter of Examples 1-7 includes subject matter where the replication request further includes scheduling information, and wherein the instructions further cause the at least one hardware processor to perform operations comprising: configuring the manifest of the replication group object to further include the scheduling information.

In Example 9, the subject matter of Example 8 includes subject matter where the instructions further cause the at least one hardware processor to perform operations comprising: performing the replication of the plurality of account objects according to a replication schedule, the replication schedule configured based on the scheduling information.

In Example 10, the subject matter of Examples 1-9 includes subject matter where the instructions further cause the at least one hardware processor to perform operations comprising: configuring the replication group object as a failover group object based on revising the manifest to include an indication that the at least one target account is allowed for failover.

In Example 11, the subject matter of Example 10 includes subject matter where the instructions further cause the at least one hardware processor to perform operations comprising: detecting a network disaster event associated with the source account of the data provider; and performing a failover of the source account to the at least one target account based on the detecting.

Example 12 is a method comprising: decoding a replication request received from a client device of a data provider, the replication request indicating a plurality of account objects for replication, the plurality of account objects associated with a corresponding plurality of account object types; generating a replication group object based on the replication request, the replication group object comprising a manifest, the manifest listing the plurality of account objects; and performing the replication of the plurality of account objects from a source account of the data provider into at least one target account, the replication based on the manifest of the replication group object.

In Example 13, the subject matter of Example 12 includes subject matter where the replication request further includes the source account and the at least one target account, and wherein the method further comprises: configuring the manifest of the replication group object to further include the at least one target account.

In Example 14, the subject matter of Examples 12-13 includes subject matter where the plurality of account object types comprises at least one of a users account object type, wherein a users account object of the users account object type lists users authorized to access the at least one target account; a roles account object type, wherein a roles account object of the roles account object type configures privileges for the users to access the at least one target account; a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

In Example 15, the subject matter of Examples 12-14 includes subject matter where the plurality of account object types comprises a database account object type, and wherein a database account object of the database account object type indicates one or more databases of the data provider.

In Example 16, the subject matter of Example 15 includes subject matter where the replication request further includes the database account object and a list of at least one allowed database, the at least one allowed database being a subset of the one or more databases, and wherein the method further comprises: configuring the manifest of the replication group object to further include the database account object and the list of allowed databases.

In Example 17, the subject matter of Example 16 includes subject matter where performing the replication of the plurality of account objects further comprises: performing a replication of the allowed databases listed in the manifest of the replication group object.

In Example 18, the subject matter of Example 17 includes subject matter where the method further comprises: detecting subsequent to the replication of the allowed databases, a refresh command for the replication group object; verifying dependencies of replicated versions of the allowed databases; and generating a notification based on the verifying.

In Example 19, the subject matter of Examples 12-18 includes subject matter where the replication request further includes scheduling information, and wherein the method further comprises: configuring the manifest of the replication group object to further include the scheduling information.

In Example 20, the subject matter of Example 19 includes subject matter where the method further comprises: performing the replication of the plurality of account objects according to a replication schedule, the replication schedule configured based on the scheduling information.

In Example 21, the subject matter of Examples 12-20 includes subject matter where the method further comprises: configuring the replication group object as a failover group object based on revising the manifest to include an indication that the at least one target account is allowed for failover.

In Example 22, the subject matter of Example 21 includes subject matter where the method further comprises: detecting a network disaster event associated with the source account of the data provider; and performing a failover of the source account to the at least one target account based on the detecting.

Example 23 is a computer-readable medium comprising instructions that, when executed by one or more processors of a machine, configure the machine to perform operations comprising: decoding a replication request received from a client device of a data provider, the replication request indicating a plurality of account objects for replication, the plurality of account objects associated with a corresponding plurality of account object types; generating a replication group object based on the replication request, the replication group object comprising a manifest, the manifest listing the plurality of account objects; and performing the replication of the plurality of account objects from a source account of the data provider into at least one target account, the replication based on the manifest of the replication group object.

In Example 24, the subject matter of Example 23 includes subject matter where the replication request further includes the source account and the at least one target account, and the operations further comprising: configuring the manifest of the replication group object to further include the at least one target account.

In Example 25, the subject matter of Examples 23-24 includes subject matter where the plurality of account object types comprises at least one of a users account object type, wherein a users account object of the users account object type lists users authorized to access the at least one target account; a roles account object type, wherein a roles account object of the roles account object type configures privileges for the users to access the at least one target account; a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

In Example 26, the subject matter of Examples 23-25 includes subject matter where the plurality of account object types comprises a database account object type, and wherein a database account object of the database account object type indicates one or more databases of the data provider.

In Example 27, the subject matter of Example 26 includes subject matter where the replication request further includes the database account object and a list of at least one allowed database, the at least one allowed database being a subset of the one or more databases, and the operations further comprising: configuring the manifest of the replication group object to further include the database account object and the list of allowed databases.

In Example 28, the subject matter of Example 27 includes subject matter where performing the replication of the plurality of account objects further comprises: performing a replication of the allowed databases listed in the manifest of the replication group object.

In Example 29, the subject matter of Example 28 includes, the operations further comprising: detecting subsequent to the replication of the allowed databases, a refresh command for the replication group object; verifying dependencies of replicated versions of the allowed databases; and generating a notification based on the verifying.

In Example 30, the subject matter of Examples 23-29 includes subject matter where the replication request further includes scheduling information, and the operations further comprising: configuring the manifest of the replication group object to further include the scheduling information.

In Example 31, the subject matter of Example 30 includes, the operations further comprising: performing the replication of the plurality of account objects according to a replication schedule, the replication schedule configured based on the scheduling information.

In Example 32, the subject matter of Examples 23-31 includes, the operations further comprising: configuring the replication group object as a failover group object based on revising the manifest to include an indication that the at least one target account is allowed for failover.

In Example 33, the subject matter of Example 32 includes, the operations further comprising: detecting a network disaster event associated with the source account of the data provider; and performing a failover of the source account to the at least one target account based on the detecting.

Example 34 is at least one machine-readable medium including instructions that, when executed by processing circuitry, cause the processing circuitry to perform operations to implement any of Examples 1-33.

Example 35 is an apparatus comprising means to implement any of Examples 1-33.

Example 36 is a system to implement any of Examples 1-33.

Example 37 is a method to implement any of Examples 1-33.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   decoding a replication request received from a client device of a data provider, the replication request indicating a plurality of account objects for replication as a unit within a failover group object, the plurality of account objects being associated with a corresponding plurality of account object types, and the plurality of account object types comprising at least a users account object type;
   generating a replication group object based on the replication request, the replication group object comprising a manifest, the manifest listing the plurality of account objects forming the unit and at least one target account associated with the replication, the plurality of account objects including a users account object of the users account object type listing users authorized to access the at least one target account;
   performing the replication of the plurality of account objects as a unit from a source account of the data provider associated with a first deployment of the data provider into the failover group object stored at the at least one target account, the failover group object including the manifest, the at least one target account associated with a second deployment of the data provider, and the replication based on the manifest of the replication group object;
   detecting one or more access privileges associated with the second deployment of the data provider and specified by an account object of the plurality of account objects listed in the manifest;
   granting at least one computing device at the first deployment, access to the plurality of account objects replicated into the at least one target account based on the one or more access privileges;

performing a refresh operation of the replication group object at the least one target account based on a refresh command for the replication group object; and generating a notification based on the refresh operation.

2. The system of claim 1, wherein the replication request further includes the source account and the at least one target account, and wherein the instructions further cause the at least one hardware processor to perform operations comprising:

configuring the manifest of the replication group object to further include the at least one target account.

3. The system of claim 1, wherein the plurality of account object types further comprises at least one of:

a roles account object type, wherein a roles account object of the roles account object type configures the one or more access privileges for accessing the at least one target account;

a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

4. The system of claim 1, wherein the plurality of account object types comprises a database account object type, and wherein a database account object of the database account object type indicates one or more databases of the data provider.

5. The system of claim 4, wherein the replication request further includes the database account object and a list of at least one allowed database, the at least one allowed database being a subset of the one or more databases, and wherein the instructions further cause the at least one hardware processor to perform operations comprising:

configuring the manifest of the replication group object to further include the database account object and the list of allowed databases.

6. The system of claim 5, wherein the instructions causing performing the replication of the plurality of account objects further cause the at least one hardware processor to perform operations comprising:

performing a replication of the allowed databases listed in the manifest of the replication group object from the source account of the data provider associated with the first deployment into the at least one target account associated with the second deployment.

7. The system of claim 6, wherein the instructions further cause the at least one hardware processor to perform operations comprising:

verifying dependencies of replicated versions of the allowed databases during the refresh operation; and generating the notification based on the verifying.

8. The system of claim 1, wherein the replication request further includes scheduling information, and wherein the instructions further cause the at least one hardware processor to perform operations comprising:

configuring the manifest of the replication group object to further include the scheduling information.

9. The system of claim 8, wherein the instructions further cause the at least one hardware processor to perform operations comprising:

performing the replication of the plurality of account objects according to a replication schedule, the replication schedule configured based on the scheduling information.

10. The system of claim 1, wherein the instructions further cause the at least one hardware processor to perform operations comprising:

configuring the replication group object as a failover group object based on revising the manifest to include an indication that the at least one target account is allowed for failover.

11. The system of claim 10, wherein the instructions further cause the at least one hardware processor to perform operations comprising:

detecting a network disaster event associated with the source account of the data provider; and performing a failover of the source account to the at least one target account based on the detecting.

12. A method comprising:

decoding, by at least one hardware processor, a replication request received from a client device of a data provider, the replication request indicating a plurality of account objects for replication as a unit within a failover group object, the plurality of account objects being associated with a corresponding plurality of account object types, and the plurality of account object types comprising at least a users account object type;

generating, by the at least one hardware processor, a replication group object based on the replication request, the replication group object comprising a manifest, the manifest listing the plurality of account objects forming the unit and at least one target account associated with the replication, the plurality of account objects including a users account object of the users account object type listing users authorized to access the at least one target account;

performing, by the at least one hardware processor, the replication of the plurality of account objects as a unit from a source account of the data provider associated with a first deployment of the data provider into the failover group object stored at the at least one target account, the failover group object including the manifest, the at least one target account associated with a second deployment of the data provider, and the replication based on the manifest of the replication group object;

detecting one or more access privileges associated with the second deployment of the data provider and specified by an account object of the plurality of account objects listed in the manifest;

granting at least one computing device at the first deployment, access to the plurality of account objects replicated into the at least one target account based on the one or more access privileges;

performing a refresh operation of the replication group object at the least one target account based on a refresh command for the replication group object; and generating a notification based on the refresh operation.

13. The method of claim 12, wherein the replication request further includes the source account and the at least one target account, and wherein the method further comprises:

configuring the manifest of the replication group object to further include the at least one target account.

14. The method of claim 12, wherein the plurality of account object types further comprises at least one of:

a roles account object type, wherein a roles account object of the roles account object type configures the one or more access privileges for accessing the at least one target account;

a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

15. The method of claim 12, wherein the plurality of account object types comprises a database account object type, and wherein a database account object of the database account object type indicates one or more databases of the data provider.

16. The method of claim 15, wherein the replication request further includes the database account object and a list of at least one allowed database, the at least one allowed database being a subset of the one or more databases, and wherein the method further comprises:

configuring the manifest of the replication group object to further include the database account object and the list of allowed databases.

17. The method of claim 16, wherein performing the replication of the plurality of account objects further comprises:

performing a replication of the allowed databases listed in the manifest of the replication group object from the source account of the data provider associated with the first deployment into the at least one target account associated with the second deployment.

18. The method of claim 17, wherein the method further comprises:

verifying dependencies of replicated versions of the allowed databases during the refresh operation; and
generating the notification based on the verifying.

19. The method of claim 12, wherein the replication request further includes scheduling information, and wherein the method further comprises:

configuring the manifest of the replication group object to further include the scheduling information.

20. The method of claim 19, wherein the method further comprises:

performing the replication of the plurality of account objects according to a replication schedule, the replication schedule configured based on the scheduling information.

21. The method of claim 12, wherein the method further comprises:

configuring the replication group object as a failover group object based on revising the manifest to include an indication that the at least one target account is allowed for failover.

22. The method of claim 21, wherein the method further comprises:

detecting a network disaster event associated with the source account of the data provider; and
performing a failover of the source account to the at least one target account based on the detecting.

23. A computer-readable medium comprising instructions that, when executed by one or more processors of a machine, configure the machine to perform operations comprising:

decoding a replication request received from a client device of a data provider, the replication request indicating a plurality of account objects for replication as a unit within a failover group object, the plurality of account objects being associated with a corresponding plurality of account object types, and the plurality of account object types comprising at least a users account object type;

generating a replication group object based on the replication request, the replication group object comprising a manifest, the manifest listing the plurality of account objects forming the unit and at least one target account associated with the replication, the plurality of account objects including a users account object of the users account object type listing users authorized to access the at least one target account;

performing the replication of the plurality of account objects as a unit from a source account of the data provider associated with a first deployment of the data provider into the failover group object stored at the at least one target account, the failover group object including the manifest, the at least one target account associated with a second deployment of the data provider, and the replication based on the manifest of the replication group object;

detecting one or more access privileges associated with the second deployment of the data provider and specified by an account object of the plurality of account objects listed in the manifest;

granting at least one computing device at the first deployment, access to the plurality of account objects replicated into the at least one target account based on the one or more access privileges;

performing a refresh operation of the replication group object at the least one target account based on a refresh command for the replication group object; and generating a notification based on the refresh operation.

24. The computer-readable medium of claim 23, wherein the replication request further includes the source account and the at least one target account, and the operations further comprising:

configuring the manifest of the replication group object to further include the at least one target account.

25. The computer-readable medium of claim 23, wherein the plurality of account object types further comprises at least one of:

a roles account object type, wherein a roles account object of the roles account object type configures the one or more access privileges for accessing the at least one target account;

a warehouse object type, wherein a warehouse object of the warehouse object type indicates compute resources for executing a workload associated with one or more databases of the data provider; and a resource monitor object type, wherein a resource monitor object of the resource monitor object type configures monitoring usage of the compute resources.

26. The computer-readable medium of claim 23, wherein the plurality of account object types comprises a database account object type, and wherein a database account object of the database account object type indicates one or more databases of the data provider.

27. The computer-readable medium of claim 26, wherein the replication request further includes the database account object and a list of at least one allowed database, the at least one allowed database being a subset of the one or more databases, and the operations further comprising:

configuring the manifest of the replication group object to further include the database account object and the list of allowed databases.

28. The computer-readable medium of claim 27, wherein performing the replication of the plurality of account objects further comprises:

performing a replication of the allowed databases listed in the manifest of the replication group object from the source account of the data provider associated with the first deployment into the at least one target account associated with the second deployment.

29. The computer-readable medium of claim 28, the operations further comprising:
verifying dependencies of replicated versions of the allowed databases during the refresh operation; and
generating the notification based on the verifying.

30. The computer-readable medium of claim 23, wherein the replication request further includes scheduling information, and the operations further comprising:
configuring the manifest of the replication group object to further include the scheduling information; and
performing the replication of the plurality of account objects according to a replication schedule, the replication schedule configured based on the scheduling information.

* * * * *